(12) United States Patent
Bergman et al.

(10) Patent No.: US 6,446,060 B1
(45) Date of Patent: Sep. 3, 2002

(54) SYSTEM AND METHOD FOR SEQUENTIAL PROCESSING FOR CONTENT-BASED RETRIEVAL OF COMPOSITE OBJECTS

(75) Inventors: Lawerence D. Bergman, Mount Kisco; Vittorio Castelli, White Plains; Chung-Sheng Li, Ossining; John R. Smith, New Hyde Park, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/237,734

(22) Filed: Jan. 26, 1999

(51) Int. Cl.[7] .............................................. G06F 17/30
(52) U.S. Cl. ...................................... 707/3; 707/104.1
(58) Field of Search ............................ 705/10; 707/204, 707/103, 10, 5, 100, 3, 104.1; 382/233; 703/3; 369/36

(56) References Cited

U.S. PATENT DOCUMENTS

| | | | | |
|---|---|---|---|---|
| 5,177,685 A | * | 1/1993 | Davis et al. | |
| 5,579,471 A | * | 11/1996 | Barber et al. | |
| 5,813,009 A | * | 9/1998 | Johnson et al. | 707/100 |
| 5,893,909 A | * | 4/1999 | Nomura et al. | 707/5 |
| 5,966,702 A | * | 10/1999 | Fresko et al. | 707/1 |
| 5,966,730 A | * | 10/1999 | Zulch | 711/162 |
| 5,995,459 A | * | 11/1999 | Kappel et al. | |
| 5,995,965 A | * | 11/1999 | Experton | 707/10 |
| 6,003,039 A | * | 12/1999 | Barry et al. | 707/103 |
| 6,105,022 A | * | 8/2000 | Takahashi et al. | 707/3 |
| 6,128,630 A | * | 10/2000 | Shackelford | 707/204 |
| 6,131,099 A | * | 10/2000 | Johnson et al. | 707/104 |

* cited by examiner

*Primary Examiner*—Kim Vu
*Assistant Examiner*—Tam V Nguyen
(74) *Attorney, Agent, or Firm*—Kevin M. Jordan; Anne Vachon Dougher

(57) ABSTRACT

Similarity measure has been one of the critical issues for successful content-based retrieval. Simple quadratic forms of distance is inadequate as it does not necessary correspond to perceived similarity nor is it adaptive to different applications. This patent application describes a new sequential query processing algorith for evaluating content-based composite object queries. The composite objects consist of spatial and temporal arrangements of simple objects. The simple objects are defined in terms of spatial, temporal, feature and semantic attributes. The query method defines a process for executing a best-first search for the matches to the query, while providing a flexible framework for broadening the search space as required. The query method guarantees that there are no false dismissals of the candidate composite objects.

21 Claims, 23 Drawing Sheets

| KEY 1 | KEY 2 | SEMANTICS | SPATIAL | | TEMPORAL | | FEATURES | | | |
|---|---|---|---|---|---|---|---|---|---|---|
| | OBJECT | NAME | LOCATION | SIZE | LOCATION | SIZE | COLOR | TEXTURE | SHAPE | MOTION |
| IMAGE ID | OB ID | OB TYPE | (X,Y) | (W,H) | (TX,TY) | (TW,TH) | Vc | Vt | Vs | Vm |

FIG.5

| SUB-GOAL | BINDINGS (ABCDefgh) | ARGUMENTS |
|---|---|---|
| 1 NAME | [-f-----b] | (B,h) |
| 2 COLOR | [f---b----] | (A,e) |
| 3 NW | [zb------] | (A,B) |
| 4 SW | [-b-f----] | (B,D) |
| 5 SHAPE | [---z--b-] | (D,g) |
| 6 TEXTURE | [--f--b--] | (C,f) |
| 7 WEST | [z-z-----] | (A,C) |
| 8 NEAR | [--zz----] | (C,D) |

FIG.12

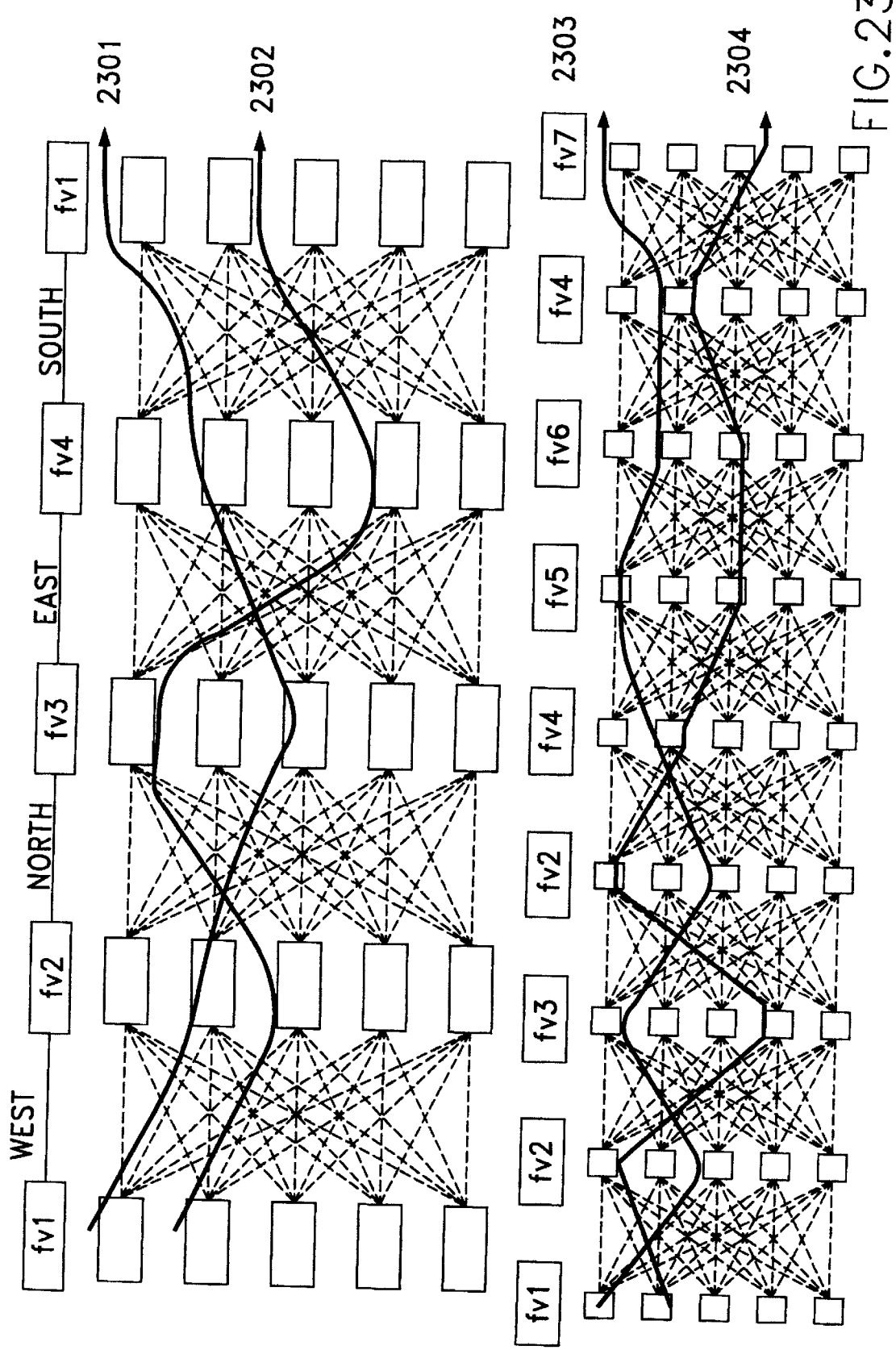

SYSTEM AND METHOD FOR SEQUENTIAL PROCESSING FOR CONTENT-BASED RETRIEVAL OF COMPOSITE OBJECTS

FIELD OF THE INVENTION

The present invention relates generally to improved information retrieval systems for images and other nonstructure data, and more particularly to converting a query with fuzzy specifications of one or more objects and spatial or temporal relationships between different objects into a set of subgoals, organizing the entire search space into blocks blocks according to the set of subgoals; and processing the query blocks in the order of likelihood of satisfying, the final constraints without possible false dismissal.

BACKGROUND OF THE INVENTION

It is becoming increasingly important for multimedia databases to provide capabilities for content-based retrieval of composite objects. Composite objects consist of several simple objects which have feature, spatial, temporal, semantic attributes, and spatial and temporal relationships between them. Recent methods for retrieving images and videos by content from large archives utilize feature descriptions and feature comparison metrics in order to index the visual information. Examples of such content-based retrieval systems include the IBM Query by Image Content (QBIC) system detailed in "Query by image and video content: The {IQBI} system." by M. Flickner, et al in "IEEE Computer", 28(9):23–32. (September 1995); the Virage visual information retrieval system detailed in "Virage image search engine: an open framework for image management," by J. Bach, et al in "Symposium on Electronic Imaging: Science and Technology—Storage & Retrieval for Image and Video Databases {IV}", volume 2670, pages 76–87. (1996), the MIT Photobook, detailed in "Tools for content-based manipulation of image databases," by A. Pentland, et al in "Proceedings of the SPIE Storage and Retrieval Image and Video Databases II", (February 1994); the Alexandria project at UCSB detailed in "Texture features for browsing and retrieval of image data," by B. S. Manjunath and W. Y. Ma, "IEEE Trans. Pattern Analysis Machine Intell. Special Issue on Digital Libraries", 8 (1996) and in "Dimensionality reduction using multidimensional scaling for image search," by M. Beatty and B. S. Manjunath, published in the "Proc. IEEE International Conference on Image Processing" (October 1997); and the IBM/NASA Satellite Image Retrieval System detailed "Progressive content-based retrieval from distributed image/video databases," by in C.-S. Li, V. Castelli, and L. Bergman in the "Proceedings of the International Symposium of Circuit and System", IEEE (1997).

It is becoming increasingly important for multimedia databases to provide capabilities for content-based retrieval of composite objects. Composite objects consist of several simple objects which have features, spatial, temporal and semantic attributes, and spatial and temporal relationships between them. The need for compound search queries frequently arises in various scientific and engineering applications, for processing such as the following:

Retrieve those Synthetic Aperture Radar (SAR) Satellite images and identify those regions in the images with texture type (e.g., ice) similar to the search target, Retrieve those one-meter resolution satellite images and identify those regions in the images with spectral features (e.g., crop) similar to the search target, Retrieve those LANDSAT Thematic Mapper (TM) satellite images and identify those regions in the images with a combination of spectral and texture features (e.g., indicative of terrain type) similar to the search target.

These scenarios frequently arise in the following applications:

Environmental epidemiology: wherein there is a need to retrieve locations of houses which are vulnerable to epidemic diseases such as Hantavirus and Denge fever based on a combination of environmental factors (e.g. isolated houses that are near bushes or wetlands), and weather patterns (e.g. a wet summer followed by a dry summer);

Precision farming: for (1) retrieving locations of cauliflower crop developments that are exposed to clubroot, which is a soil-borne disease that infects cauliflower crop, where cauliflower and clubroot are recognized spectral signature, and exposure results from their spatial and temporal proximity; and (2) retrieving those fields which have abnormal irrigation, (3) Retrieve those regions which have higher than normal soil temperature;

Precision forestry: for (1) calculating areas of forests that have been damaged by hurricane, forest fire, or storms, and (2) estimating the amount of the yield of a particular forest;

Petroleum exploration: where there is a need to retrieve those regions which exemplify specific characteristics in the collection of seismic data, core images, and other sensory data;

Insurance: for (1) retrieving those regions which may require immediate attention due to natural disasters such as earthquake, forest fire, hurricane, and tornadoes, and (2) retrieving those regions have higher than normal claim rate (or amount) that are correlated to the geography—close to coastal regions, close to mountains, in high crime rate regions, etc.;

Medical image diagnosis: for retrieval of all MRI images of brains that have tumors located within the hypothalamus, which tumors are characterized by shape and texture, and the hypothalamus is characterized by shape and spatial location within the brain;

Real estate marketing: to retrieve all houses that are near a lake (color and texture), have a wooded yard (texture) and are within 100 miles of skiing (mountains are also given by texture); and Interior design: for retrieval of all images of patterned carpets which consist of a specific spatial arrangement of color and texture primitives.

Until recently, content-based query and spatial query paradigms have been largely distinct. On one hand, there has been extensive investigation of using logical representations to facilitate efficient processing of spatial and temporal queries of symbolic images (see: "Design and Evaluation of Algorithms for Image Retrieval by Spatial Similarity", by V. N. Gudivada and V. V. Raghavan, in the "ACM Trans. on Information Systems", Vol. 13, No. 2 (April 1995); "Iconic Indexing by {2-D} Strings", by S.-K. Chang and Q. Y. Shi and C. Y. Yan, "IEEE Trans. on Pattern Recognition and Machine Intelligence", Vol. 9, No. 3, pp. 413–428 (May 1987)), and videos ("OVID: Design and Implementation on a Video-Object Database System", by E. Oomoto and K. Tanaka, "Trans. on Knowledge and Data Engineering", vol. 5 (August 1993)). The various logical representations such as 2D-strings, the Θ-R representation, and the spatial orientation graph (SOG) allow indexing and retrieval based upon spatial and temporal relationships.

On the other hand, content-based image retrieval systems, such as Virage, Photobook and QBIC, allow querying based upon image features. Examples of the visual features supported by these systems include color, texture, shape, edge, and so forth.

The integration of content-based and spatial image query methods is only recently begun to be investigated (see the above-referenced publications of Li et al, Smith and Chang, and, "Retrieval by content in symbolic-image databases", by A. Soffer and H. Samet, in the "Symposium on Electronic Imaging: Science and Technology—Storage & Retrieval for Image and Video Databases IV", 2670, pp144–155 (1996)"; "Content-Based Indexing of Spatial Objects in Digital Libraries", by S.-F Chang et al; S.-S. Chen, in the "Journal of Visual Communication and Image Representation", 1, pp.16–27 (March 1996); E, "Similarity Searching in Large Image Databases", by. G. M. Petrakis and C. Faloutsos, "Department of Computer Science, University of Maryland", 3388, (1995).) The SaFe spatial and feature image query engine computes the spatial and feature queries by decomposing the composite query into parallel, content-based region queries. After the joining the results, the spatial relationships are evaluated only for the surviving images using query-time 2D-string projection and comparison. SaFe is also being extended to spatial and temporal querying of video (see: "VideoQ: An Automated Content Based Video Search System Using Visual Cues", by S.-F. Chang, et al in the "Proc. ACM Multimedia '97", ACM, (November, 1997)). In the IBM/NASA satellite image retrieval system, a framework is provided for the querying of earth observation imagery by incorporating semantic and feature-based object descriptions into a rule-based spatial query framework.

The difficulty in content-based querying of composite objects results from the combinatorial explosion in candidate composite objects, which number on the order of $O(L^K)$ for composites of K simple objects selected from a database of L simple objects. Furthermore, content-based querying requires significant computational processing in retrieving features from the database and computing feature similarities. In order to design a sufficiently scalable and powerful solution, the system needs to efficiently manage the search process in order to respond to the queries.

SUMMARY OF THE INVENTION

In accordance with the aforementioned needs, the present invention is directed to an improved apparatus and method to generate an efficient linear ordering of the component descriptions (sub-goals) of the composite object (query-goal) and generates a sequential query processing schedule. Since the content-based components of the query involves the assessment of spatial, temporal and feature similarities, the system builds and maintains an overall similarity score between each candidate composite retrieved from the database and the query composite object. The inventive system selects the candidate composite objects for evaluation in a best-first search. Since the similarity scores are monotonically non-decreasing, by partially back-tracking through only the stages which involve content-based querying, the inventive method finds the optimal solution in an efficient manner.

BRIEF DESCRIPTION OF THE DRAWING

These and other features and advantages of the present invention will become apparent from the following detailed description, taken in conjunction with the accompanying drawings, wherein:

FIG. 5 shows the schema of an extensional database;

FIG. 12 shows an example of argument binding;

FIG. 23 shows the linearization of the composite objects from examples given in FIG. 22.

DETAILED DESCRIPTION OF THE PREFERRED EMBODIMENT

Figure 1:
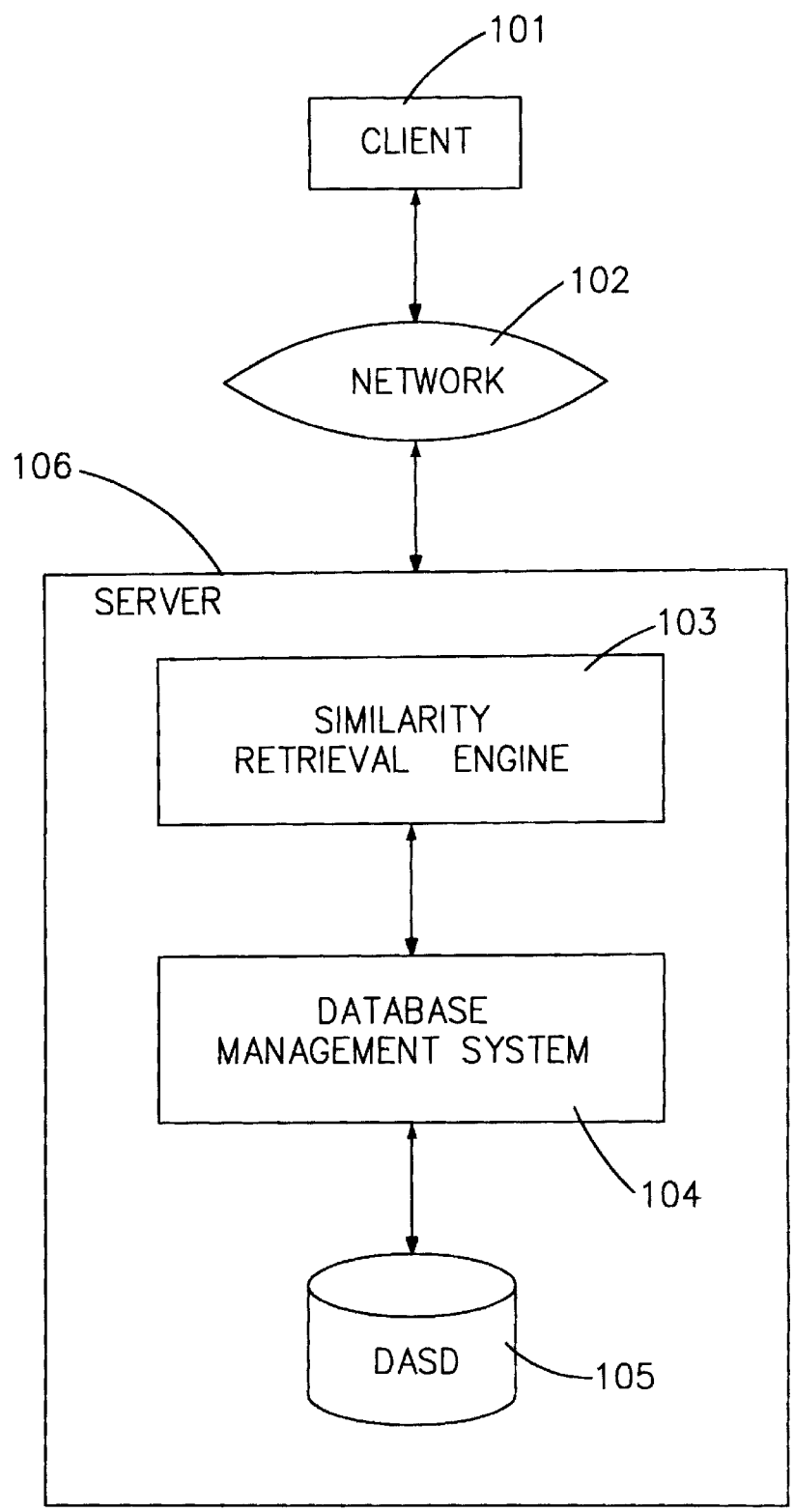
FIG. 1 shows an example of a block diagram of a networked client/server system.

FIG. 1 depicts an example of a client/server architecture having features of the present invention. As depicted, multiple clients (101) and multiple servers (106) are interconnected by a network (102). The server (106) includes one or more conventional database management systems (DBMS) (104) and one ore more direct access storage devices (DASD) (105). A query is typically prepared on the client (101) machine and submitted to the server (106) through the network (102). Such queries are usually based on similarity search (or nearest neighbor search) and is processed by the similarity query engine (103). The similarity query engine (103) interacts with a database management system (DBMS) (104) for retrieving or updating a database stored in the DASD (105).

As an example, the database can store satellite images, medical images, seismic data, and time series. Multimedia data, such as audio, video and images, can be stored separately from the metadata used for indexing. One key component of the metadata that can be used for facilitating the indexing and retrieval of the media data is the set of feature vectors extracted from the raw data. For example, texture, color histogram and shape can be extracted from regions of the image and be used for constructing indices for retrieval. In general, indexes can be generated by first creating a representation of the database to be indexed as a set of vectors, where each vector corresponds to a row in the database and the elements of each vector correspond to the values, for the particular row, contained in the columns for which an index must be generated. Creating a representation of the database as a set of vectors is well known in the art. The representation can be created by, but is not limited to the steps of: creating for each row of the database an array of length equal to the dimensionality of the index to be generated; and copying to the elements of the array, the values contained in the columns, of the corresponding row, for which the index must be generated.

It is assumed that an image database consists of a set of N feature vectors. Each feature vector has n dimensions. The feature vectors potentially represent a combination of, for example, color, texture and shape information. A query is started by presenting a query feature vector to the system. Consider that the feature vector may correspond to a particular query image, region or object. Initially, the K best matches are retrieved using a Euclidean metric. For two n-dimensional feature vectors, the most commonly used similarity measure between two vectors, u and v, is the Euclidean distance measure, d, defined as $$d^2 = \sum_{i=1}^{n} (u_i - v_i)^2 \quad (1)$$

where $u=[u_1, \ldots u_n]^T$ and $v=[v_1, \ldots, v_n]^T$.

The K results whose feature vectors are closest to the target feature vectors are then returned to the user for visual inspection or further processing.

In the following discussion, it is assumed that an image database contains Z images and that a typical image contains N simple objects. Simple objects are defined as spatial regions within the images, or spatial/temporal regions within image sequences. Simple objects have semantic, feature, spatial and/or temporal attributes. For example, a simple texture object corresponding to a region with homogeneous texture is determined by automatic texture image segmentation. In this case, the texture of the i-th region in an image is characterized by a texture feature vector $v_i$. The similarity between two texture regions $v_i$ and $v_j$ is measured by a similarity function $S(v_i, v_j)$, defined by:

$$S(v_i, v_j) = e^{-(v_i - v_j)^T (v_i - v_j)} \quad (2)$$

Consequently, identical feature vectors will have a similarity measure of unity, i.e., $S(v_i, v_j)=1$. Feature vectors with infinite Euclidean distance will have a similarity measure of zero.

The spatial, temporal, feature, semantic and relational data for the simple objects is stored in a database. Consider the tabular schema in FIG. 5 for representing simple objects. This information forms the extensional database (EDB) for the simple objects. In this table, IMAGEID uniquely identifies each image, and OBID uniquely identifies each simple object in each image. Together, IMAGEID and OBID form the primary key for simple objects in the database. The tuple (X,Y) denotes the spatial location of the object centroid. For photographic images, (X,Y) denotes pixel coordinates. For geo-registered images, (X,Y) denotes latitude and longitude. The spatial width and height of the minimum bounding rectangle (MBR) of the object is given by (W,H). Similarly, (TX,TY) and (TW,TH) give the temporal location and temporal size, respectively, in terms of temporal bounding rectangles.

Several feature attributes are stored for each object such as color, texture, shape and motion. These features are given by $v_c$, $v_t$, $v_s$, and $v_m$, respectively. Semantics information such as a semantic label for each object (such as a "house") is also stored in the database. Composite objects are defined by the composition of K simple objects. The composition involves spatial, temporal and fuzzy relationships between simple objects. In general, composite objects may be nested within other composite objects.

Figure 2B:
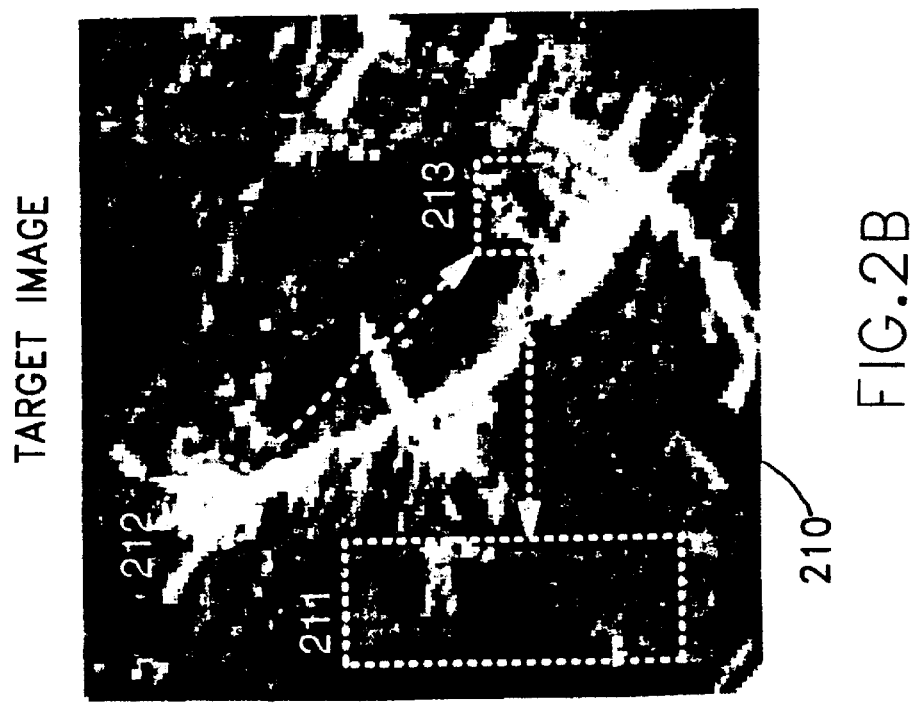
FIG. 2 shows an example of the composite object which consists of a shape object, a texture object, and a semantic object.
Figure 2A:
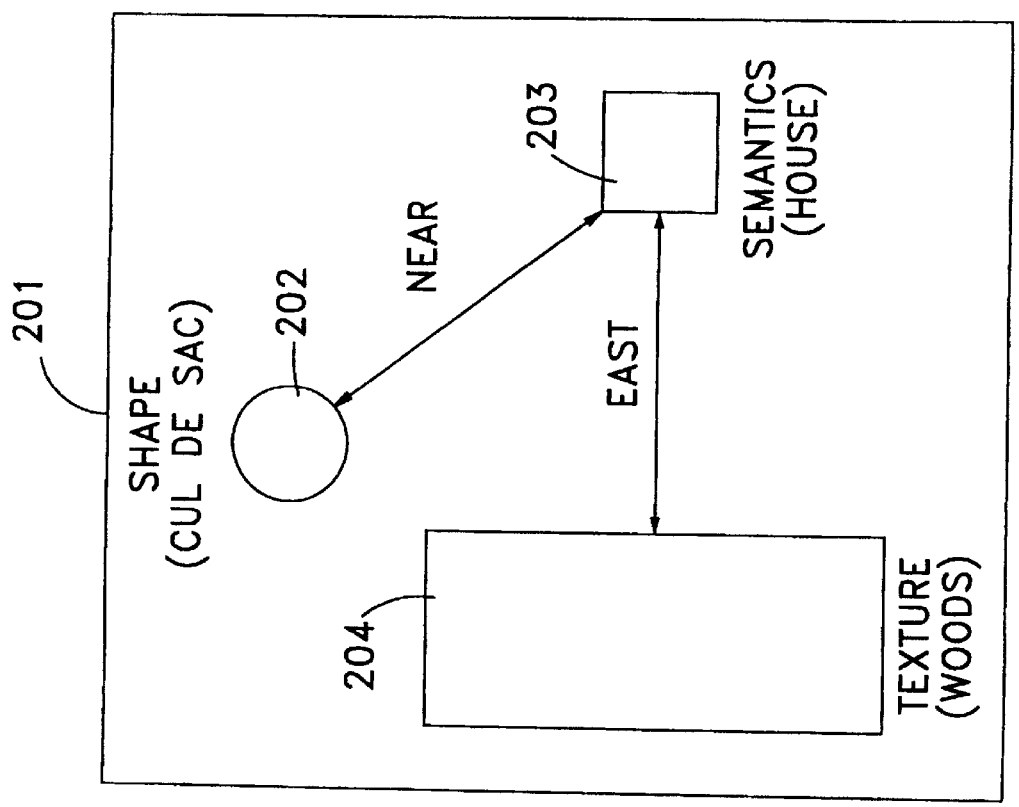

FIGS. 2A and 2B provides a simple example of a composite object. In this case, the query is to search for a shape object "cul de sac" (202), which is near a semantic object "house" (203), and has texture object "woods" (204) to the east of the semantic object in 201 of FIG. 2A. The corresponding target image is shown in 210 of FIG. 2B. The counterparts of 202, 203, and 204 in the image are 212, 213, and 214, respectively.

Figure 3:
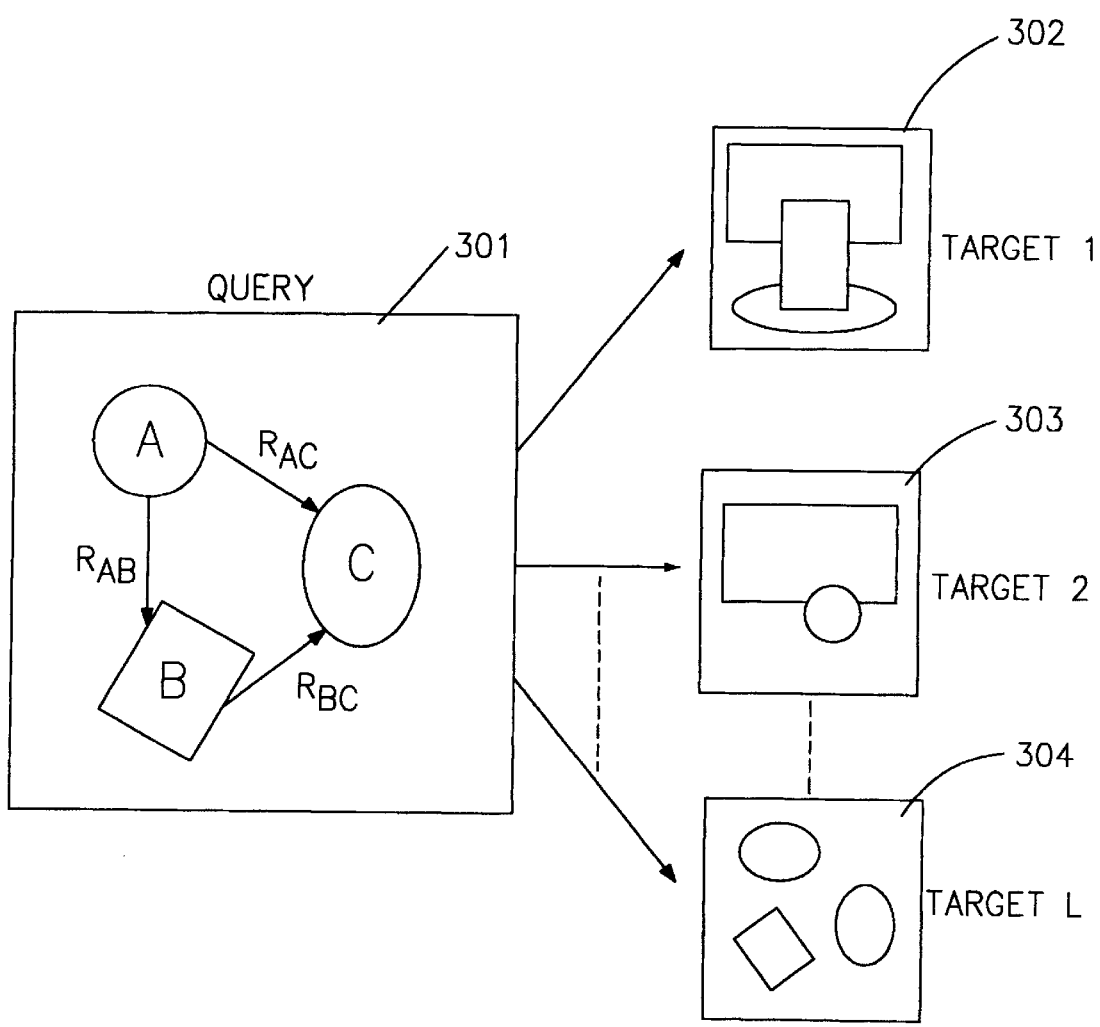
FIG. 3 shows an example of trying to match a query to a set of targets.
Figure 4:
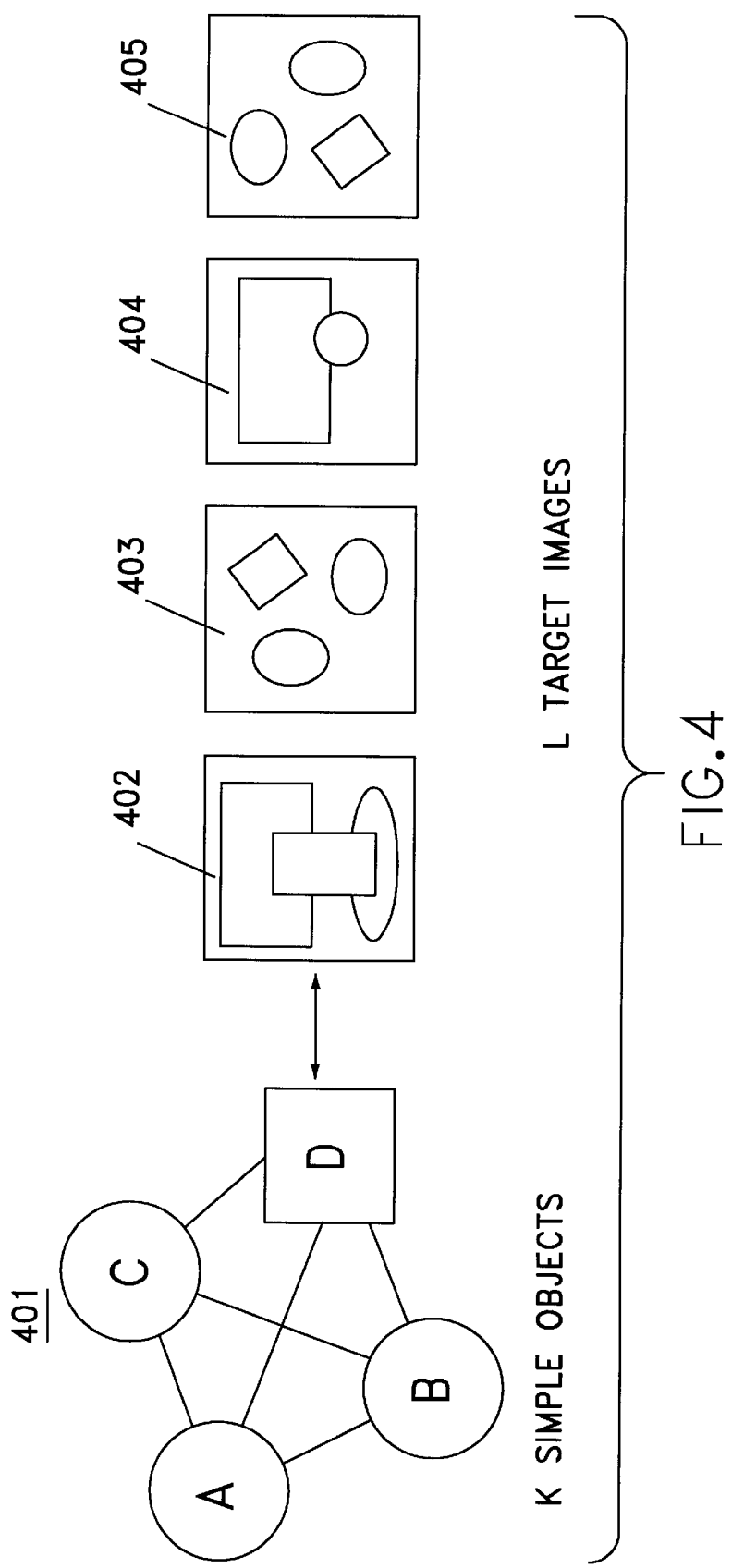
FIG. 4 shows an example of trying to match a query consisting of K simple objects to L target images.
Figure 6:
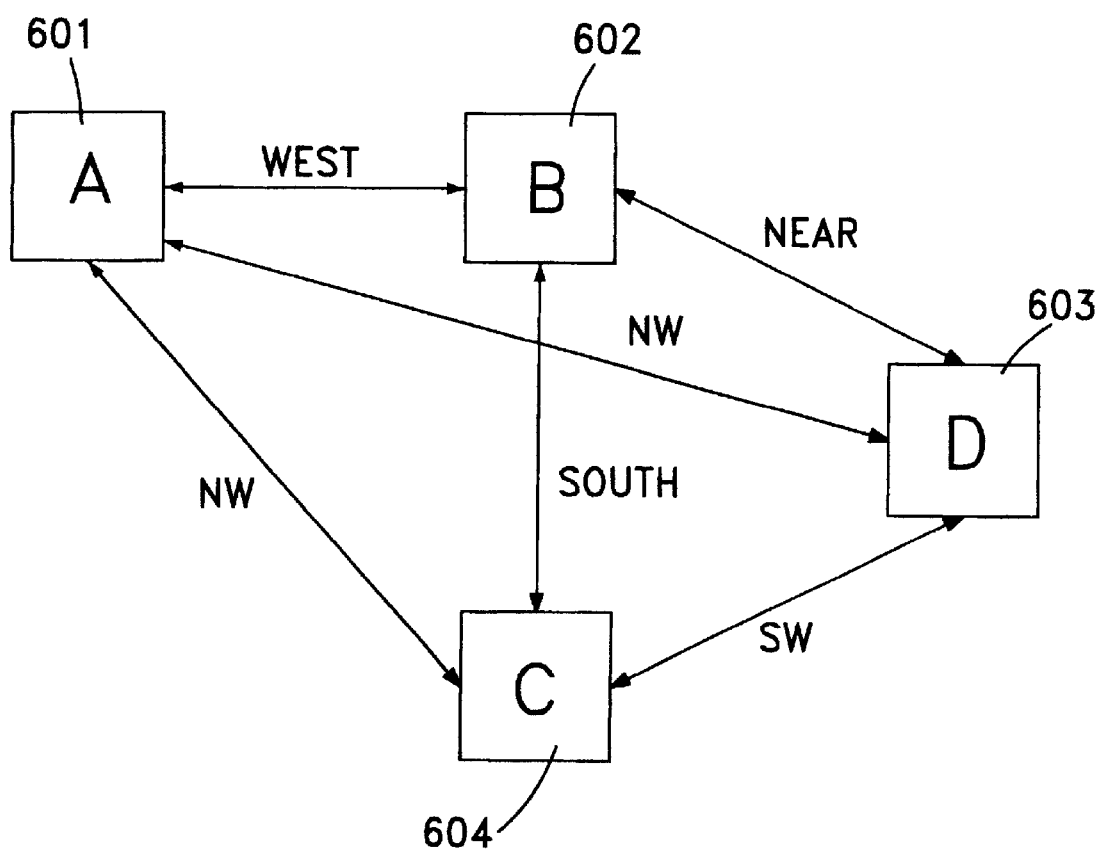
FIG. 6 shows an example of a composite object consisting of four objects with six spatial relationships.

FIG. 3 illustrate a query example and a database example. A query, such as the one shown in 301, is issued against a database consisting of L target images (302, 303, and 304). In general, a composite object query, an example of which is shown in FIG. 4, can consist of up to K simple objects (A, B, C and D of 401). This query will be issued against a database consisting of L target images (such as those shown in 402, 403, 404, 405). FIG. 6 illustrates an example composite object consisting of four simple objects: {A(601), B(602), C(604), D(603)}. The spatial configuration of the composite object is depicted by the pairwise spatial relationships between the four simple objects.

A composite object query is formed by giving a set of simple objects and the attributes and relationships of interest between them. The attributes and relationships (e.g., the spatial relationships of FIG. 6) are given in the form of sub-goals. Each of the sub-goals is evaluated by the rules of the system.

Figure 7:
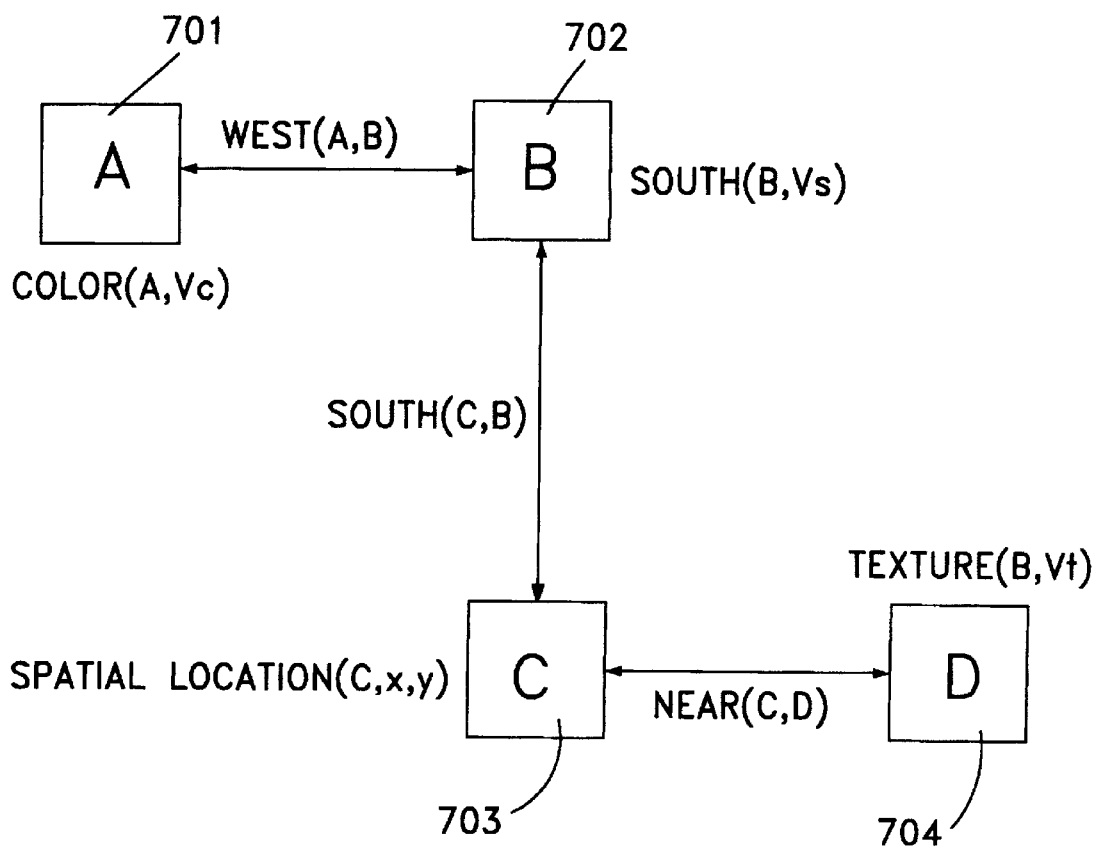
FIG. 7 shows an example of a composite object consisting of the same four objects as in FIG. 6 with four spatial relationships.

FIG. 7 illustrates a composite object query which defines a spatial arrangement of the four simple objects: {A(701), B(702), C(703), D(704)}. The simple objects are given as follows: A in terms of color $v_c$, B in terms of shape $v_s$, C in terms of spatial location (x, y), and D in terms of texture $v_t$. The spatial composition of A, B, C and D is given by the following spatial relationships: WEST(A, B), SOUTH(C, B), and SW(C, D).

As illustrated in FIGS. 6 and 7, the composite object query involves only a subset of the attributes and relationships in the candidate composite objects. Each candidate composite object is assessed by measuring its similarity to the query composite object. This overall similarity is determined by the similarities in the attributes and relationships of simple objects between the query and candidate composite objects. These similarities are determined by evaluating sub-goals according to spatial and temporal rules, content-based rules, and the fuzzy conjunctions between them (detailed further below).

The spatial and temporal relationships of simple objects are determined by a set of rules. For example, consider the following spatial rules:

WEST(A, B)←A.x<B.x
NORTH (A, B)←A.y>B.y
NORTHWEST (A, B)←WEST(A, B) ∧NORTH(A, B).

Each rule contains a head, i.e., NORTHWEST(A, B), and a body. The body consists of the conjunction of a list sub-goals, i.e., WEST(A, B), and NORTH(A, B). Each of the sub-goals consists of a predicate symbol, i.e., NORTH, and arguments, i.e., A, B. In general, the predicates are either defined by the stored relations (EDB) or by the rules.

In order to evaluate the sub-goals, the simple objects A and B are either passed-in explicitly in the arguments of the sub-goals, or are retrieved from the EDB in evaluating the rule. For example, distinction is made between two types of variables which are passed as arguments in the sub-goals: bounded, meaning defined in the query, and free.

In the case of passing bounded variables as arguments, the values are already in hand, and the sub-goal merely acts as a filter in evaluating the function logic. In the case of passing free variables as arguments, objects are first retrieved from the EDB by the system, and then the function logic is evaluated for the retrieved objects. In general, the evaluation of the sub-goals may involve a combination of bounded and free variables. For example, consider again the sub-goal: NORTHWEST(A, B). Evaluation of the sub-goal is made with two bounded variables, as defined in the query as follows: NORTHWEST("The White House", "The Lincoln Memorial"). The arguments of the sub-goal A and B are bounded in the call because the values are given explicitly. Next, consider the sub-goal: NORTHWEST("The White House", y). In this case, only the argument A is bounded, but, B is free and requires an unconstrained lookup in the EDB. Finally, the query goal: NORTHWEST (x, y), asks for all objects which are north-west of another object. Obviously, this requires free lookups of A and B.

There are several techniques for optimizing the evaluation of a set of logical sub-goals involving free and bounded variables. One technique, called "bound-is-best," involves the reordering of the sub-goals to give the sub-goals with bounded variables priority over those with free variables. The method includes sideways information passing between sub-goals. Once a free variable is bound, the bindings are retained in subsequent sub-goals.

Figure 9:
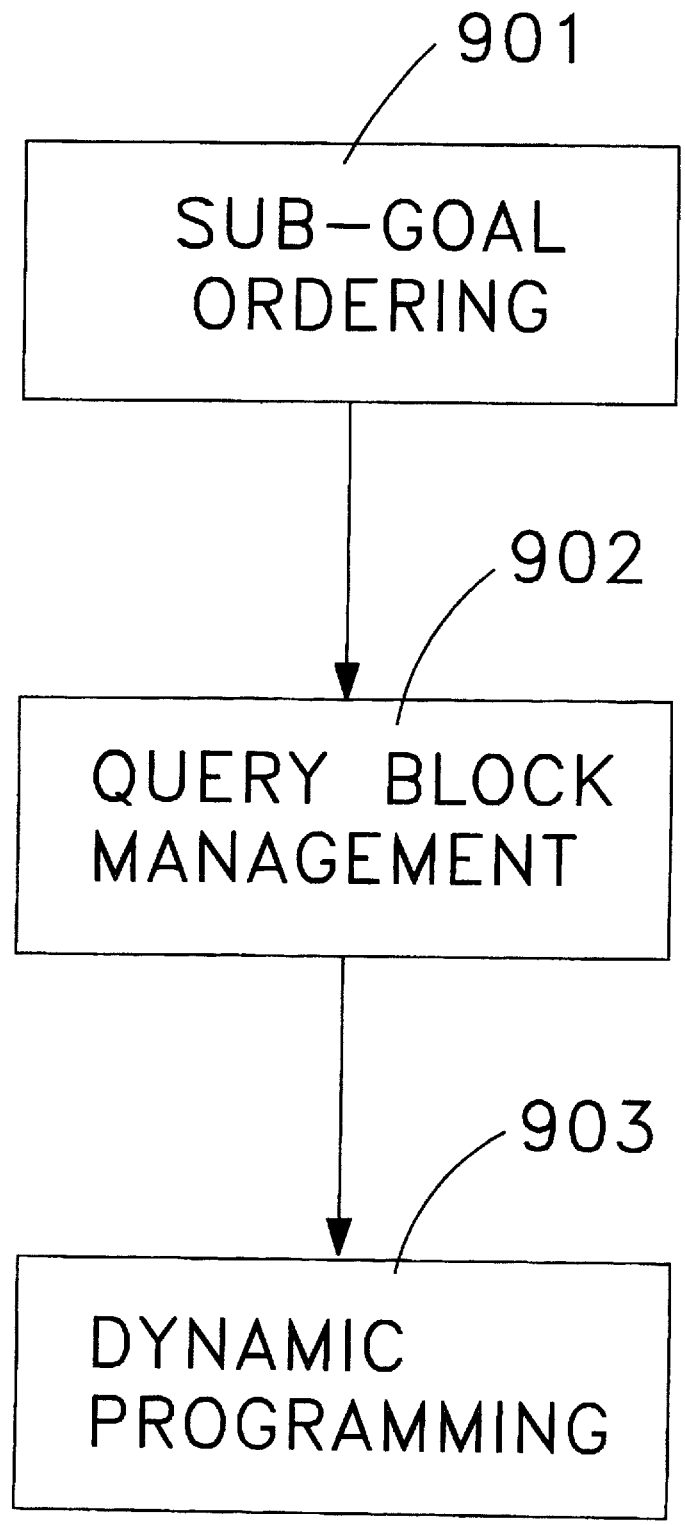
FIG. 9 shows the flow chart of the inventive query processing.

In generating the query program in accordance with the present invention, the method of rewriting and ordering the sub-goal is used, as detailed with reference to in FIG. 9. First, a set of fuzzy spatial and content-based rules are included, which introduce a new class of fuzzy variables. The spatial relationships are implemented in a fuzzy framework as follows: the angle between two simple objects A and B is defined by $$\angle \theta(A, B) = \arctan\left(\frac{A \cdot y - B \cdot y}{A \cdot x - B \cdot x}\right) \quad (3)$$

In the fuzzy framework, the spatial relationships are evaluated by the following fuzzy rules:
WEST(A, B)←0.5(cos(∠θ(A,B)−π)+1>THRESH
NORTH(A, B)←0.5(cos(∠θ(A,B)−π/2)+1>THRESH
NORTHWEST(A, B)←0.5(cos(∠θ(A,B)−¾π)+1>THRESH.

Alternatively, the fuzzy spatial rules generate "K" nearest neighbors, as follows:
WEST(A, B, K)←0.5(cos(∠θ(A,B)−π)+1∈K smallest candidates
NORTH(A, B, K)←0.5(cos(∠θ(A,B)−π/2)+1∈K smallest candidates
NORTHWEST(A, B, K)←0.5(cos(∠θ(A,B)−¾π)+1∈K smallest candidates.

The features (i.e., color, texture, shape, motion) of simple objects in the query are given by feature vectors. The content-based rules evaluate the similarity of feature vectors through similarity metrics. For example, consider the following content-based rules:
COLOR(A, B)←S(A.$v_c$,B.$v_c$)
TEXTURE(A, B)←S(A.$v_t$,B.$v_t$)

The content-based rules compute the similarity score "S" from the distance between feature vectors in a metric space. Unlike the logical rules which return true or false, the similarity score is real-valued between 0 and 1. The content-based rules are defined in terms of similarity thresholds, as follows:
COLOR(A, B, THRESH)←S(A.$v_c$, B.$v_c$)>THRESH
TEXTURE(A, B, THRESH)←S(A.$v_t$, B.$v_t$)>THRESH.

Alternatively, the content-based constructors generate the K nearest neighbors, as follows:
COLOR(A, B, K)←S(A.$v_c$, B.$v_c$)∈K smallest
TEXTURE(A, B, K)←S(A.$v_t$, B.$v_t$)∈K smallest.

In both cases, the rules evaluate or generate pairs of simple objects based upon their feature attributes.

The conjunction of sub-goals (corresponding to spatial/temporal and content-based rules, and EDB records), is performed in the fuzzy framework. For example, consider the query Q(A, B, a, b), which specifies the fuzzy conjunction of three sub-goals as follows:
Q(A, B, a, b)←TEXTURE(A,a) fuzzyAND COLOR(B,b) fuzzyAND WEST(A,B)

The fuzzyAND between sub-goals $X_i$ (i=1, . . . , N) is defined by the weighted sum of the truth-value (or similarity score) of the sub-goals as follows:

$$Q = \sum_{i=1}^{N} \omega_i S_{X_i} \quad (4)$$

where $S_{X_i}$ is the fuzzy membership function of $X_i$, and $\omega_i$ is the weight of the i-th sub-goals with $\omega_i$ normalized as follows:

$$\sum_{i=1}^{N} \omega_i = 1.0.$$

There exists a wide range of tradeoffs between the storage space and the processing time in order to execute the composite objects queries. The system, in general, builds various indexes of simple objects, simple object features and composite objects, which support the evaluation of the content-based composite object queries. Below are discussed three examples, which demonstrate the extremes in storage and processing requirements: the indexing of simple objects, the indexing of all pairwise combinations of simple objects, and the indexing of all combinations of K simple objects.

Consider first that the system indexes only simple objects. For example, the simple objects are indexed by absolute spatial location and features using a multi-dimensional index. In this case, the evaluation of relationships between simple objects needs to be performed entirely at query time. For example, consider a database with Z images with each image containing, on average, N simple objects. The total space required for storing the simple objects is O(ZN). The exhaustive evaluation of all pairs of simple objects requires the retrieval of O(ZN$^2$) composite pairs. In general, therefore, the complexity of the search process grows combinatorially with the number of simple objects in each composite. Although the storage requirements are low, at query time, the system must generate and evaluate $O(ZN^K)$ combinations of K simple objects for the database of Z images in order to answer queries involving compositions of K objects.

The amount of processing is reduced by pre-materializing and indexing all pairs of simple objects. For example, consider that each image has N simple objects, then there are $N^{\{2\}}$ pairs. The spatial relationship between object pair (i, j) is represented by $(R_{ij}, \theta_{ij})$, where $R_{ij}$ is the distance between the centroids of the objects and $\theta_{ij}$ is the angle between them. Altogether, the system stores $O(ZN^2)$ records defining pairwise relationships between simple objects, which is an increase by a power of two over the case of indexing the simple objects. However, the query processing is reduced since the system does not need to generate candidate composite pairs at query time.

The final alternative is to pre-extract and index all combinations of K simple objects directly. In this case, each composition of K simple objects is specified by a record of the following form:

$$[R_{1,2}, \theta_{1,2}, \ldots, R_{ij}, \theta_{ij}, \ldots, R_{K-1,K}, \theta_{K-1,K}]$$

which is formed by concatenating the records of all the combinations of K objects. The amount of storage required is increases significantly, to $O(ZN^K)$ composite records. However, querying may be performed directly on the composite objects, which reduces processing at query time.

While each potential approach offers improved results, none of these indexing and query solutions alone is optimal since none scales in terms of either storage or processing with respect to the number of simple objects in the database or the number of simple objects within each composite object.

Furthermore, in a typical database environment, there is incomplete index support in that only a subset of attributes and relationships are indexed. For example, features such as color and texture are indexed using multi-dimensional indexing methods. As demonstrated above, pairs of simple objects can be indexed based upon spatial relationships. In general, a content-based composite object query framework is needed which does not rely on specific indexing structures, but rather adapts to those indexes that are being used.

Figure 8:
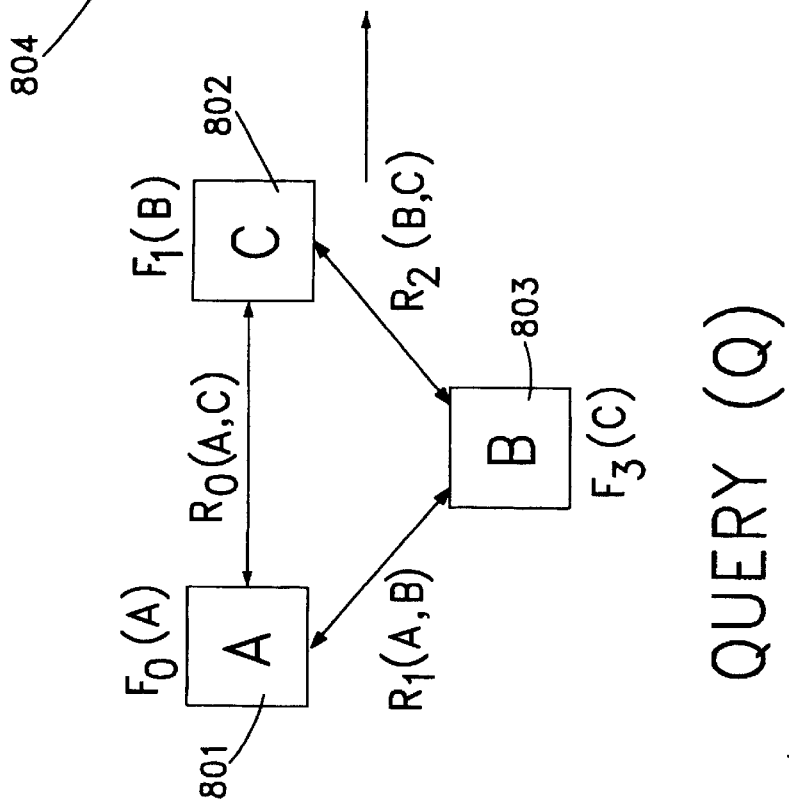
FIG. 8 shows the decomposition of a query into a set of sub-goals.

The present invention provides translation between a query, such as the one (801,802,803) shown in FIG. 8, into a set of execution plans, as shown in 804 of FIG. 8. The inventive query method consists of the following three procedures (FIG. 9):

1. Sub-goal ordering(901): wherein the composite object query is first linearized into a set of sub-goals. The sub-goals are assigned an order based upon available index structures and dependencies. As a result of this ordering, each of the sub-goals is assigned a role as either a retrieval function or a filter.
2. Query block management(902): wherein, for each sub-goal, processes are designated for retrieving blocks of the best L matches, second-best L matches, and so forth, and caching the results; followed by selecting combinations of blocks to be processed by the algorithm.
3. Dynamic program (903): wherein the inventive algorithm performs the best-first search in the trellis formed by the selected query blocks to determine the best K matches to the query.

Each linear composite object, such as the one shown in FIG. 7, is represented as a graph. Each node and arc in the graph represents an object component and a pairwise relationship, respectively. The composite object given in FIG. 7 is a special class of composite objects without loops or branches. For ease of description, this type of composite object, in which the translation into a linear graph is trivial, will first be detailed.

Figure 10:
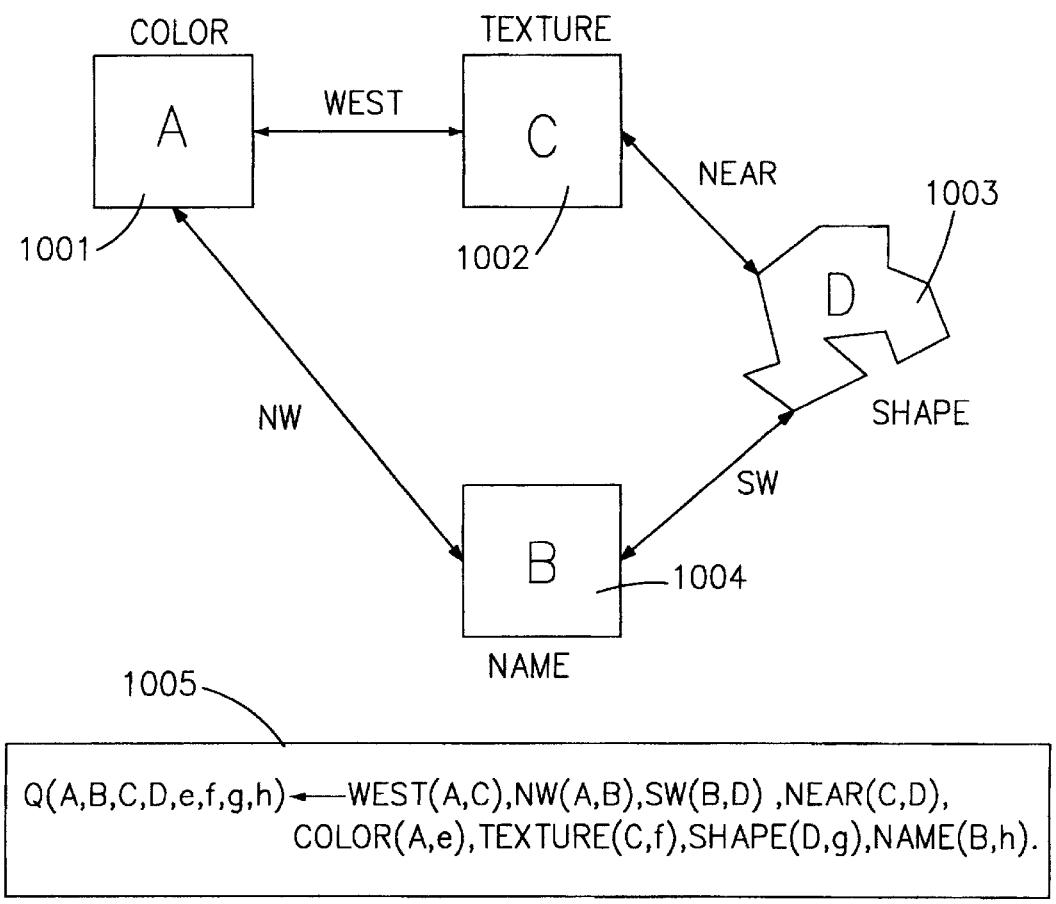
FIG. 10 shows an example of decomposing a composite object into a set of sub-goals.

The subgoal ordering (901) is now elaborated as below. A composite query is presented, which consists of content-based and logical sub-goals. For each composite query, a sequential rule-goal program is generated by ordering the sub-goals, as shown in FIG. 10. The query consists of a color object A (1001), a texture object C (1002), a shape object D (1003), and a name object (1004). Furthermore, there are four spatial relationships which capture the pairwise relationships within the compound object, specifically: west relationship between 1001 and 1002; near relationship between 1002 and 1003; southwest relationship between 1003 and 1004; and northwest relationship between 1004 and 1001. For each composite query, a logical rule-goal program is generated. The rule-goal program defines the order in which the sub-goals are processed to answer the query, as shown in 1005:

Q(A,B,C,D,e,f,g,h)←WEST(A,C), NW(A,B), SW(B,D), Near(C,D),

COLOR(A,e),TEXTURE(C,f),SHAPE(D,g),NAME(B, h)

As another example, consider the following query, Q,

Q(A, B, C, D, E, F,G)←EAST(B, D), NW(A, B), SW(B, C), NEAR(C, D),

COLOR(A, E), TEXTURE(C, F), SHAPE(D, G).

Figure 11:
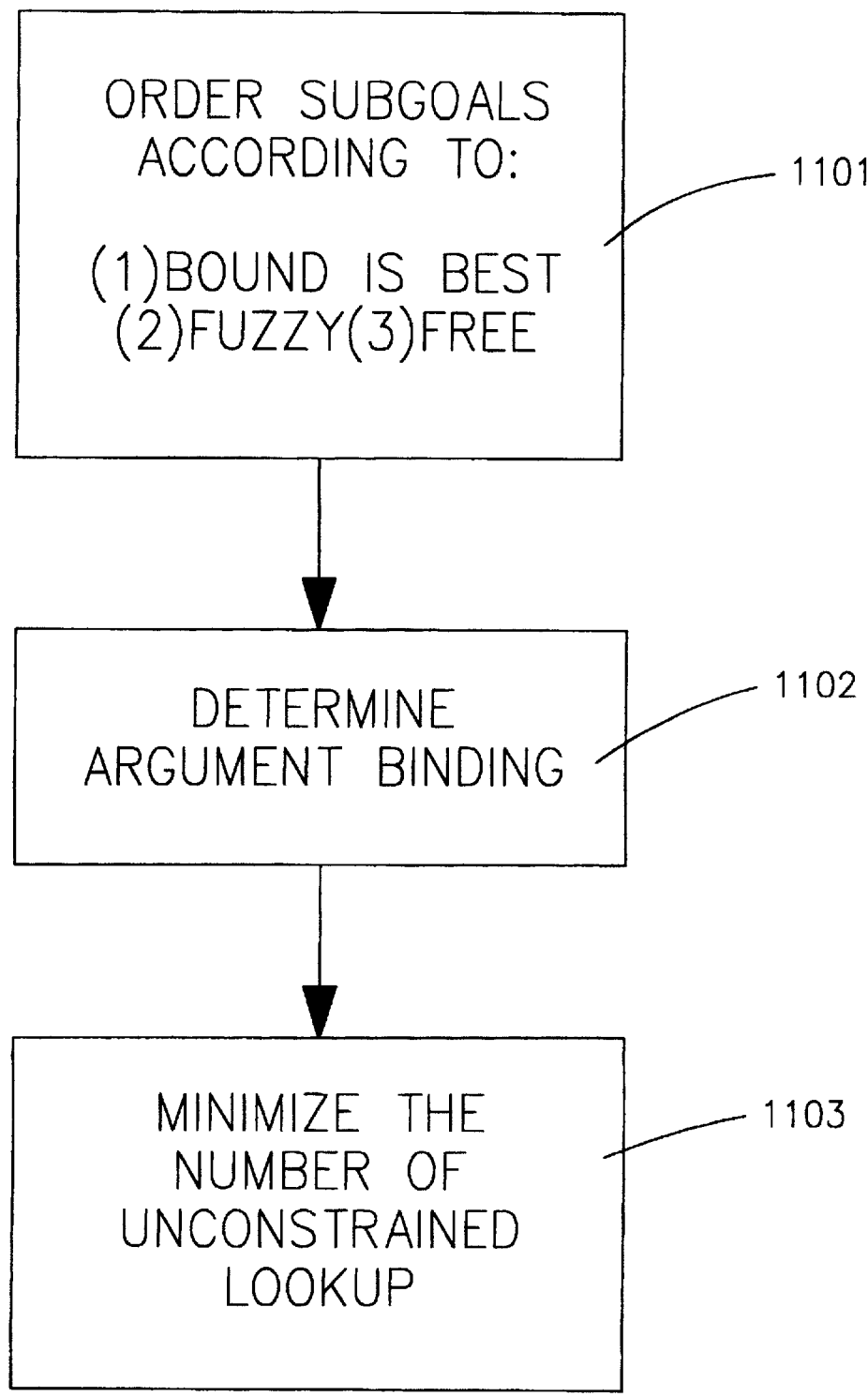
FIG. 11 shows the flowchart for determining the subgoal ordering.

The bound-is-best assumption is modified to include, bound-is-best, then fuzzy, then free. That is, sub-goals with bounded variables are moved to the front of the program, followed by those with fuzzy variables, then those with free. This process is summarized in FIG. 11:

1. Order the subgoals according to the following order (1101)
   bound is best,
   fuzzy,
   free
2. Determine the argument binding (1102),
3. Minimize the number of unconstrained lookup (1103).

Using this approach, the sub-goals of the query in FIG. 10 are evaluated in FIG. 12 in the following order, with free, bounded and fuzzy variable bindings given by [f], [b] or [z], respectively. In this example, the bound-is-best relationships are between h and B, and between e and A (assuming the color search is a precise search in this case). Consequently, these two evaluations are prioritized on top. The rest of the bindings (between A and B, B and D, D and g, and C and f) all have at least one binding. The search for (A,C) and (C,D) are put in the last as both of them are free. Similarly, the query Q(A,B,C,D,E,F,G) is evaluated as below:

| NEAR | [- - b b - - -](C, D) |
|---|---|
| COLOR | [f - - - b - -](A, E) |
| TEXTURE | [- - f - - b -](C, F) |
| SHAPE | [- - - f - - b](D, G) |
| SW | [- f z - - - -](B, C) |
| EAST | [- b - z - - -](B, D) |
| NW | [z b - - - - -](A, B). |

Figure 13:
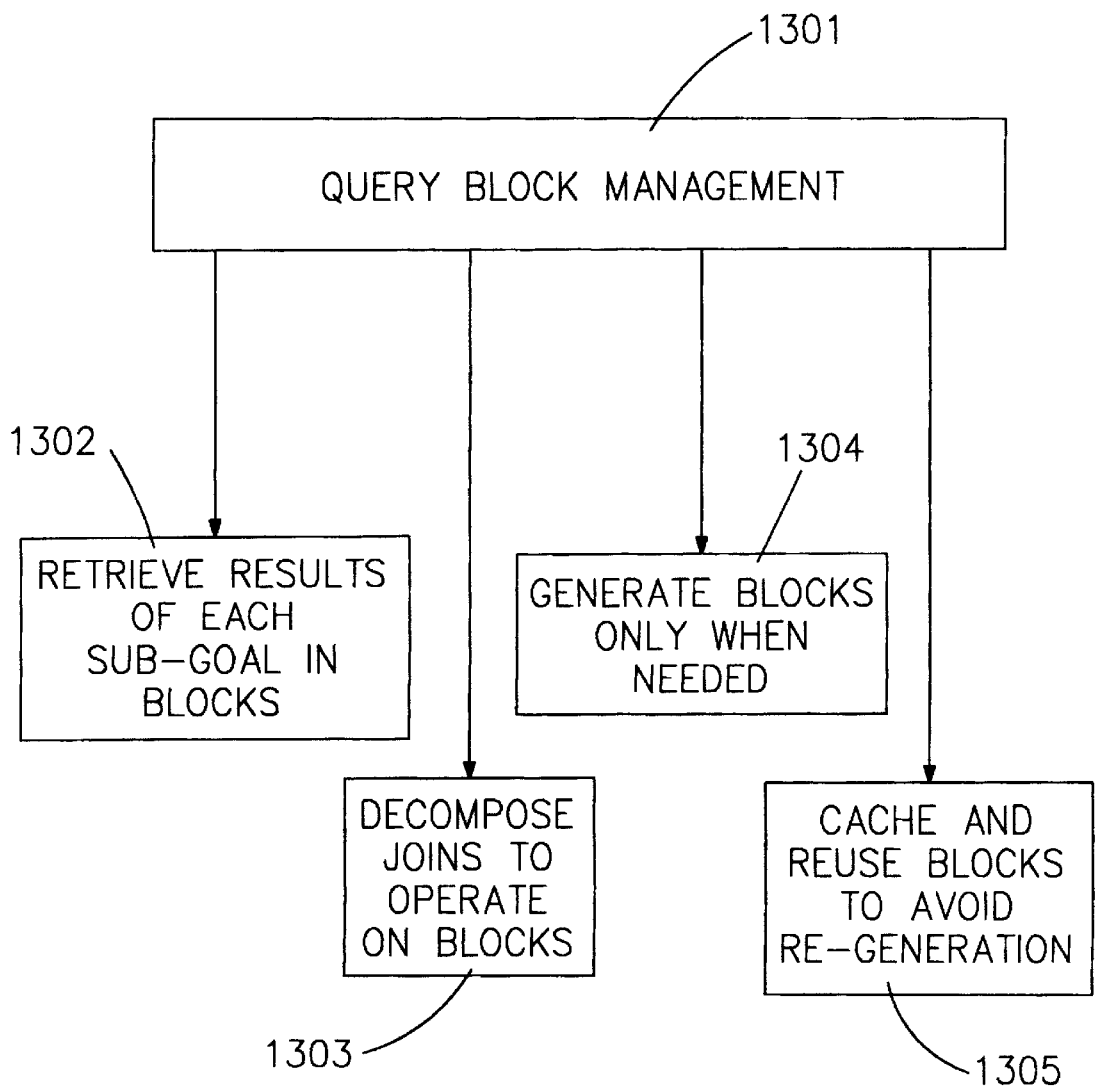
FIG. 13 shows process options for query block management.

The query block management (902 in FIG. 9 and 1301 in FIG. 13) is now elaborated as below (see FIG. 13): In general, since the database is large, it is difficult to evaluate the program directly. The second procedure decomposes each stage of the program into a list of query blocks (1302).

The query blocks are evaluated in conjunction with other query blocks by the inventive algorithm (1303). The query block is generated dynamically and is generated when it is needed (1304). The query block management system handles the generation, caching and release of query blocks (1305).

Figure 14:
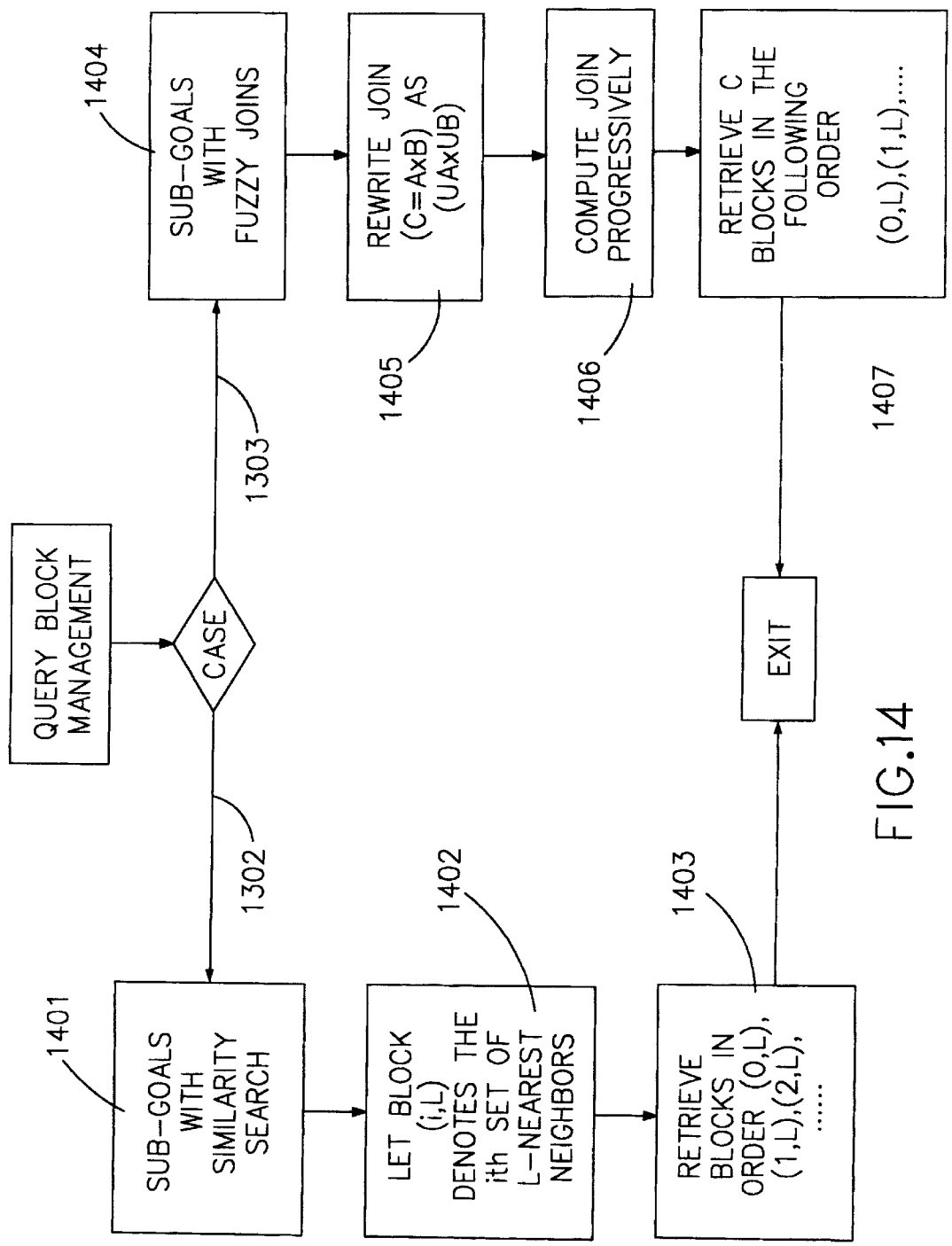
FIG. 14 shows the flowchart for the case of subgoals with similarity search and subgoals with fuzzy joins in query block management.

A query block is defined as follows: given a sub-goal, i.e., COLOR(A,B), the sub-goal is evaluated and results are returned in blocks as follows: the first best L, the second best L, the third best L, and so forth. For each sub-goal, the results are cached temporarily for use by the algorithm. The algorithm for retrieving results of each sub-goal in blocks and decomposing joins to operate on blocks is shown in FIG. 14. If the subgoal consist of similarity search (1401), then the ith set of the L-nearest neighbor is referred to as block (i,L) (1402), and the blocks are then retrieved in the sequence of (0,L), (1,L), (2,L), . . . (1403). On the other hand, if the subgoal is a fuzzy join (1404), then the join operation is rewritten as the Cartesian product between query blocks (1405), the join is computed progressively (1406), and the blocks are retrieved in the following order: (0,L), (1,L), . . . (1407).

Figure 15:
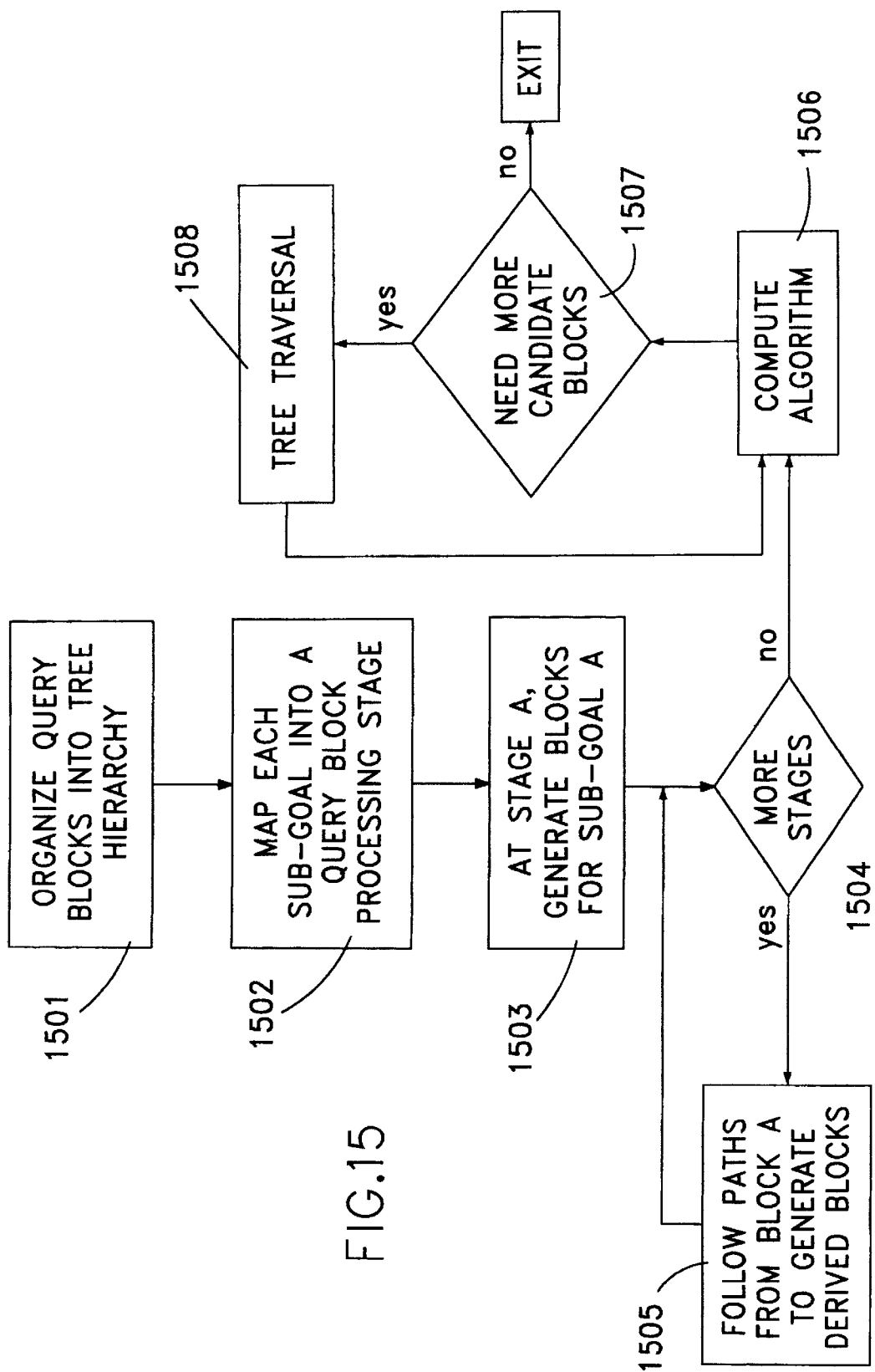
FIG. 15 shows the flowchart for generating query blocks for the inventive dynamic programming steps.

FIG. 15 shows the general algorithm for organizing query blocks into a tree hierarchy (1501). The first step is to map each subgoal into a query block processing stage (1502). At each stage, the query blocks are generated for each sub-goal (using the algorithm outlined in FIG. 14) (1503). If there are more stages in the query, the query paths are followed to generate derived blocks (1505). This step is continued until all stages are exhausted from the query. The query blocks are then passed to the algorithm (to be described below) by traversing the tree. When more candidate blocks are required in order to retrieve a sufficient number of final results (1507), the query block tree is traversed (1508) and the blocks are passed to the algorithm (1506). This process is continued until the number of retrieved results is equal to or greater than the results desired by the original query.

Figure 16:
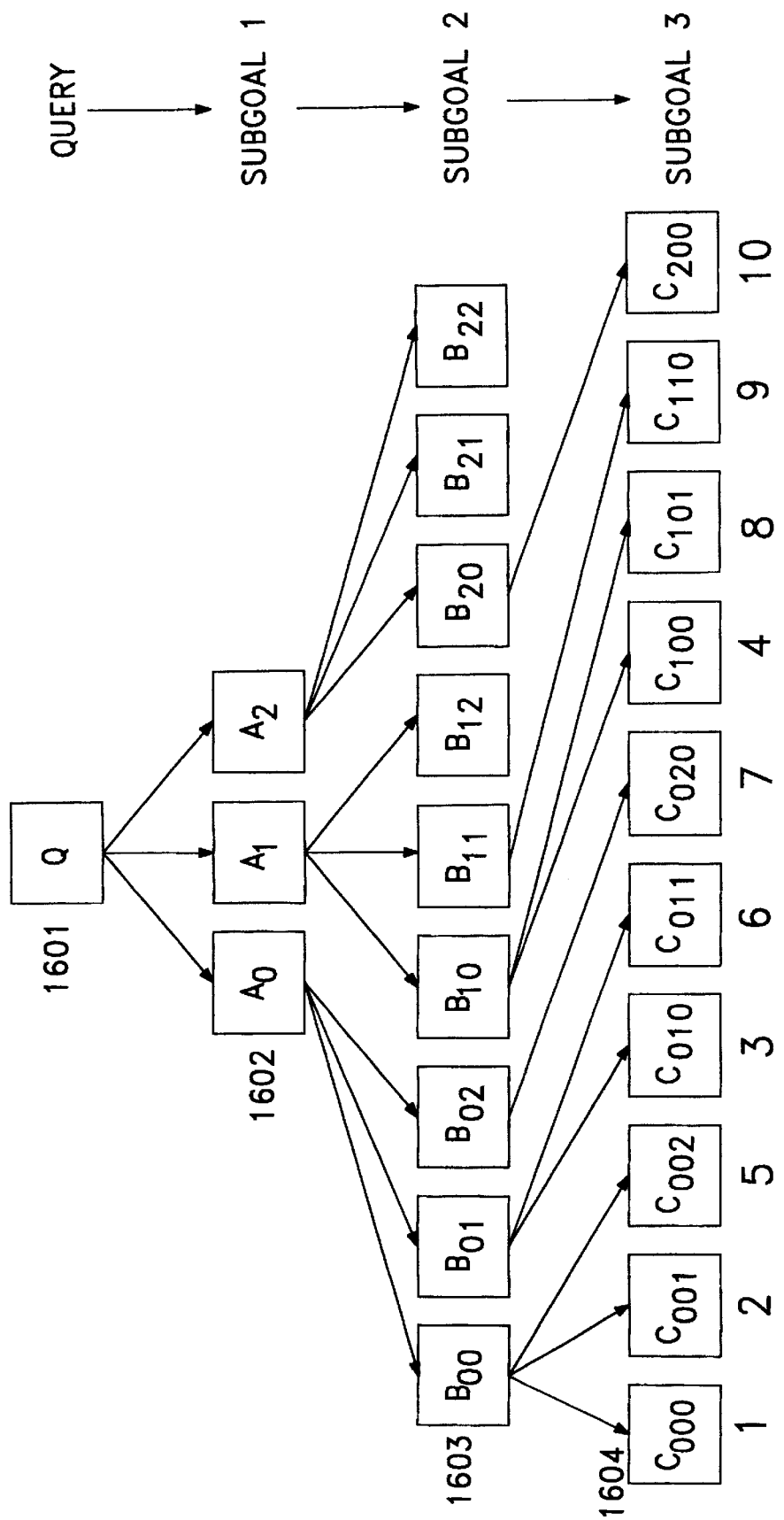
FIG. 16 shows an example for generating the query block hierarchy and the traversal.

FIG. 16 illustrate an example of generating and traversing the query block tree. The query program consists of a sequence of sub-goals A, B, C, . . . . The query block management system evaluates the sequence of sub-goals by retrieving blocks of size L. Initially, at step A, the system generates blocks $A_0, A_1, A_2, \ldots$ At step $S^{i+1}$, following the path from block $S^i$, the system generates blocks $S_0^i, S_1^i, S_2^i, \ldots$ The objectives of the query block management system are to provide paths for deeply descending towards the query answer while managing the back-offs required as the sub-goal evaluations need to be broadened. For example, the deepest descent is illustrated in path $A_0, B_{00}, C_{000}$, which uses the first best L matches from each of the sub-goals. If this path does not answer the query, then the query block management system handles the back-tracking, i.e., the system next evaluates path $A_0, B_{00}, C_{001}$, then $A_0, B_{00}, C_{002}$, then $A_0, B_{01}, C_{010}$, and so forth.

In general, the system does not need to generate and evaluate all combinations of query blocks if they are evaluated in this best-first manner. Furthermore, the query block management system defines an overall strategy for generating query blocks as needed at different points in the query. The blocks are generated, cached and released as needed. Each combination of blocks is passed to the algorithm, which provides a fast dynamic programming method for efficiently retrieving the best K matches from the set of blocks, while guaranteeing no false dismissals.

Given a combination of query blocks, the algorithm evaluates the sequence of sub-goals and retrieves the best K matches. The following two theorems show that the algorithm does not need to evaluate all the combinations of component objects (query blocks) to locate the best K answers to the query.

Let $L_A$, $L_B$ be two ranked lists. The elements of $L_A$, $L_B$ are ranked by the similarity to A and B, respectively. The similarity score of the j-th member in $L_A$ is denoted as $S_{L_A j}$. The first member always has the highest similarity score. Furthermore, $S_{R_{AB} j}$ denotes the score of the j-th member in the ranked list $R_{AB}$ between a member a∈A and a member b∈B. Let $L_{A,K}$ and $L_{B,K}$ denote the partial lists which contain the top K ranked members. (An example is in FIG. 7 in which A is described in terms of color, B is described in terms of shape, and A is to the west of B.)

Theorem 1: Assume that L and L' are generated as follows:

$$L \leftarrow L_A \text{ fuzzyAND } L_B \text{ fuzzyAND } R_{A,B}$$

$$L' \leftarrow L_{A,M} \text{ fuzzyAND } L_{B,M} \text{ fuzzyAND } R_{A,B,M}$$

where $M \geq K$. Then $L_K = L'_K$ if $$S_{L,K} \geq \max\{\omega_A S_{A,M+1} + \omega_B S_{B,1} + \omega_{AB}, \omega_A S_{A,1} + \omega_B S_{B,M+1} + \omega_{AB}\}$$

Sketch of Proof: This theorem is deduced from the fact that any members in L that involve the (M+1)-th member in A or B have a score no greater than either of them. Consequently, if $S_{C,K} \geq S_{A,M+1}$ and $S_{C,K} \geq S_{B,M+1}$, the members in $C_K$ must come from $A_M$ and $B_M$.

The above theorem is generalized to more than two ranked lists. In this case, an M exists such that the K best combinations extracted from the top M candidates from each list is the same as the K best combinations extracted from the entire list. In the following, a sequential processing algorithm is developed for the fuzzyAND definition in Eq. 4. This algorithm retrieves the best K combinations for a composite object consisting of O simple objects, where $O \geq 2$. The significance of this theorem is that only the top K candidates need to be evaluated for each component in the query without having to worry about the possibility of false dismissal.

Figure 17:
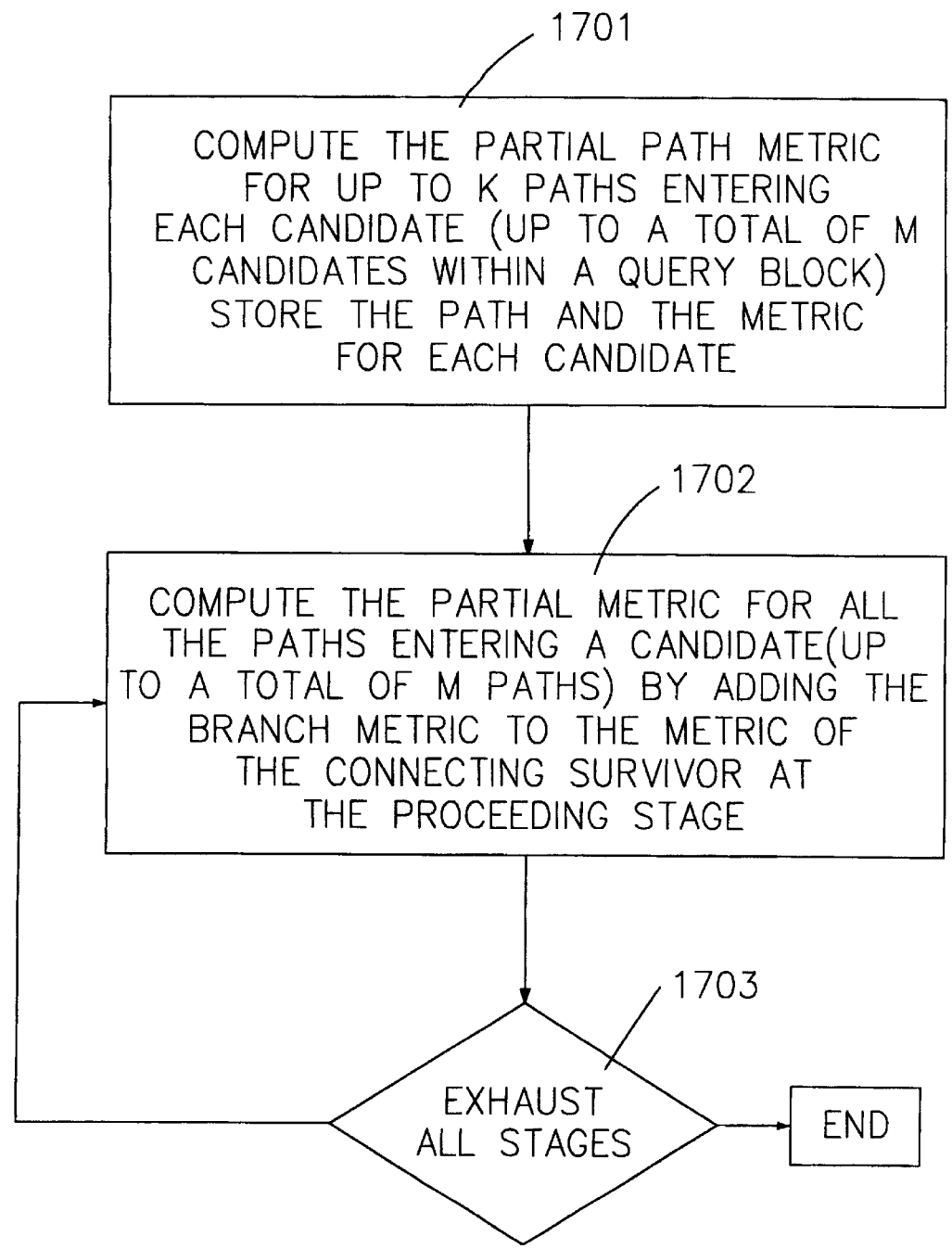
FIG. 17 shows the flowchart for performing SPROC dynamic programming.
Figure 18:
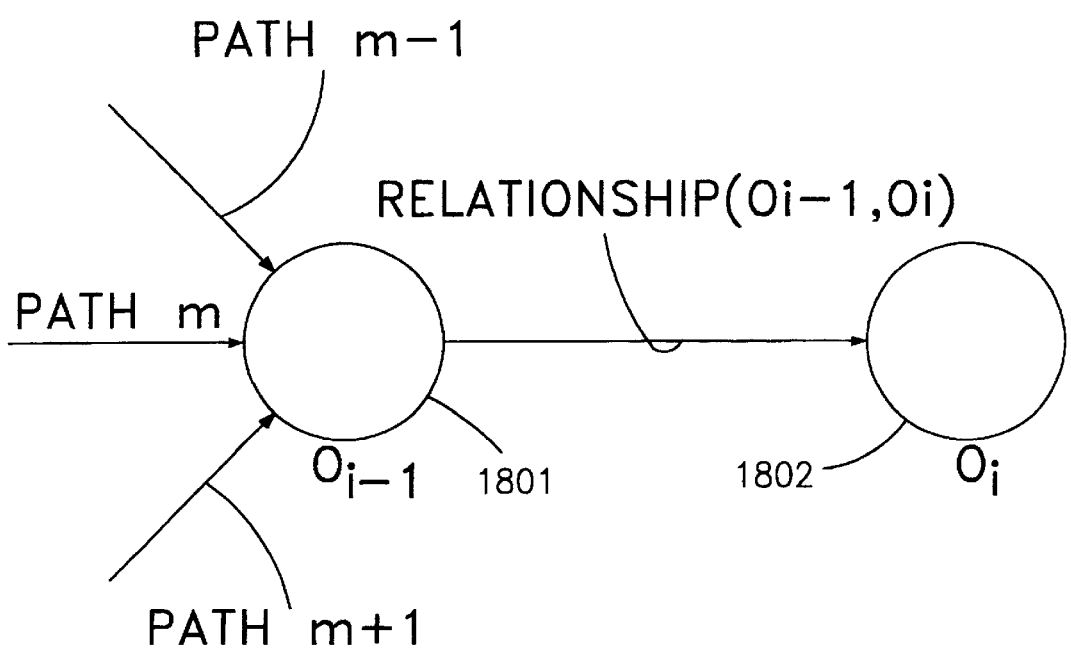
FIG. 18 illustrate the traversal of computing path metrics.
Figure 19:
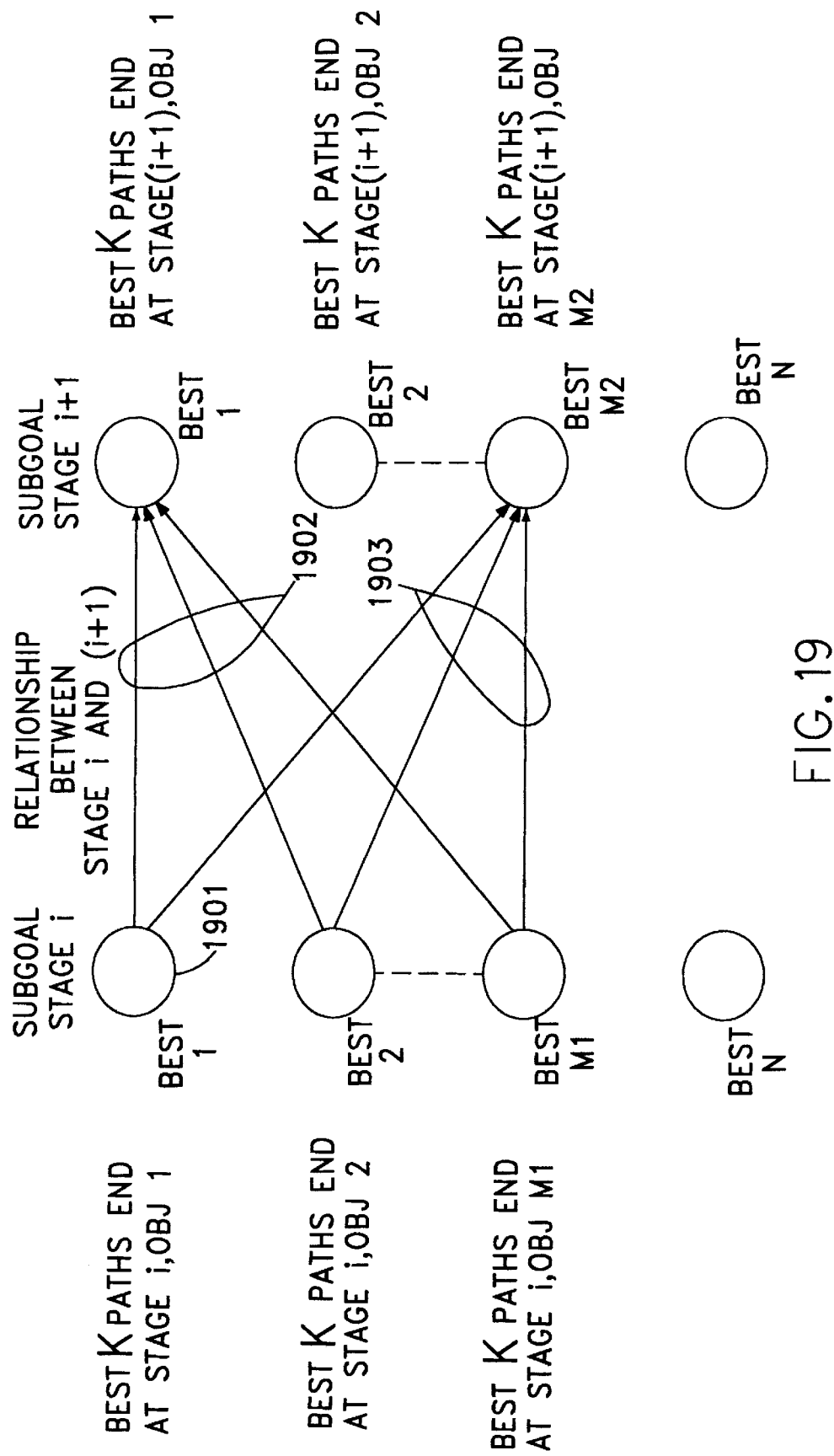
FIG. 19 shows the selection of K best paths from stage i to stage i+1.

With reference to FIG. 17, for use of the inventive algorithm, it is assumed that the composite object is represented as a linear graph (e.g. FIG. 7). Each component is represented as a stage in the trellis diagram, as shown in FIG. 18. In FIG. 18, a candidate object $O_{i-1}$ (1801) may be traversed from the previous stage via path 1, . . . , m−1, m, m+1, . . . A unique path exists between candidate object $O_{i-1}$ and candidate object $O_i$. This path captures the relationship between these two object. In general, there can be many candidate objects at each stage, as shown in FIG. 19, and each combination of resulting answers is then represented as a traversal path. Let $D_{ij,m}$ denote the similarity score of the j-th path, entering into the m-th object at the i-th stage, and each object component stores a total of K paths. Furthermore, $S_{i,m}$ denotes the similarity score of the m-th object at the i-th stage, and $S_{R_{ij,m,n}}$ denotes the similarity score between the m-th object of the i-th stage and the n-th object of the j-th stage.

1. Initialize $D_{1,*,m} = S_{1,m}$. Set i=2 (1701).
2. Evaluate all the paths entering the component object m (m≦M, where M is determined from Theorem 1) at stage i by using the following expression:

$$D_{ij,m} = D_{i-1j,n} \text{ fuzzyAND} S_{Rij,m,n} \text{ fuzzyAND } S_{i,m}$$

Note that a total of K M evaluations are required for each component object candidate (1702).
3. For component object m, store a total of K paths with the largest $D_{ij,m}$ among all the evaluated paths, and eliminate all the other survivors (1703).

4. If i=O, Select K paths with the largest $D_{Oj,m}$ from KM candidate paths, stop. Otherwise, i=i+1, go back to step 2 (1704).

FIG. 19 further illustrates the path evaluation and selection process. At subgoal stage I (1901), there are a total of N candidates from the database. Each of these candidates has K paths terminating at the candidate. Similarly, there are also N candidates for subgoal i+1. Step 4 in the algorithm (FIG. 17) is to select the best K paths entering into each candidate at subgoal i+1 from a total of possible N paths terminating at subgoal i+1 (1902 and 1903). Theorem 1 has shown that there exists an M where M is greater than K but smaller than N such that all the possible N paths entering each candidate need not be evaluated.

Figure 20:
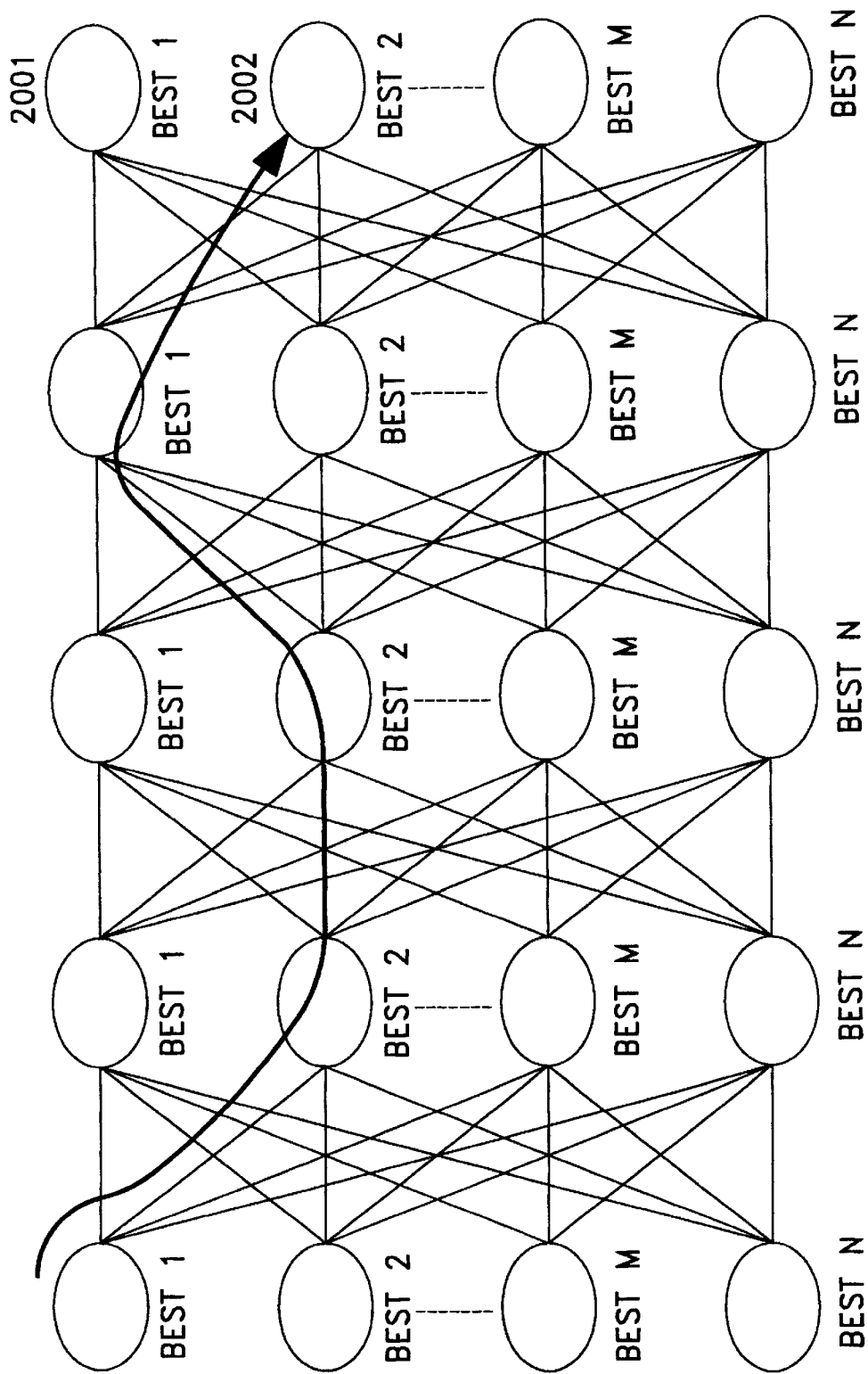
FIG. 20 shows the selection of two best candidate composite objects as traversal of trellis.

FIG. 20 shows a typical trellis with two final paths selected out of all the possible paths. In this case, path 2001 has the best path metric while path 2002 has the second best path metric.

Theorem 2: The final survivors in the algorithm have the maximum similarity scores.

Figure 21:
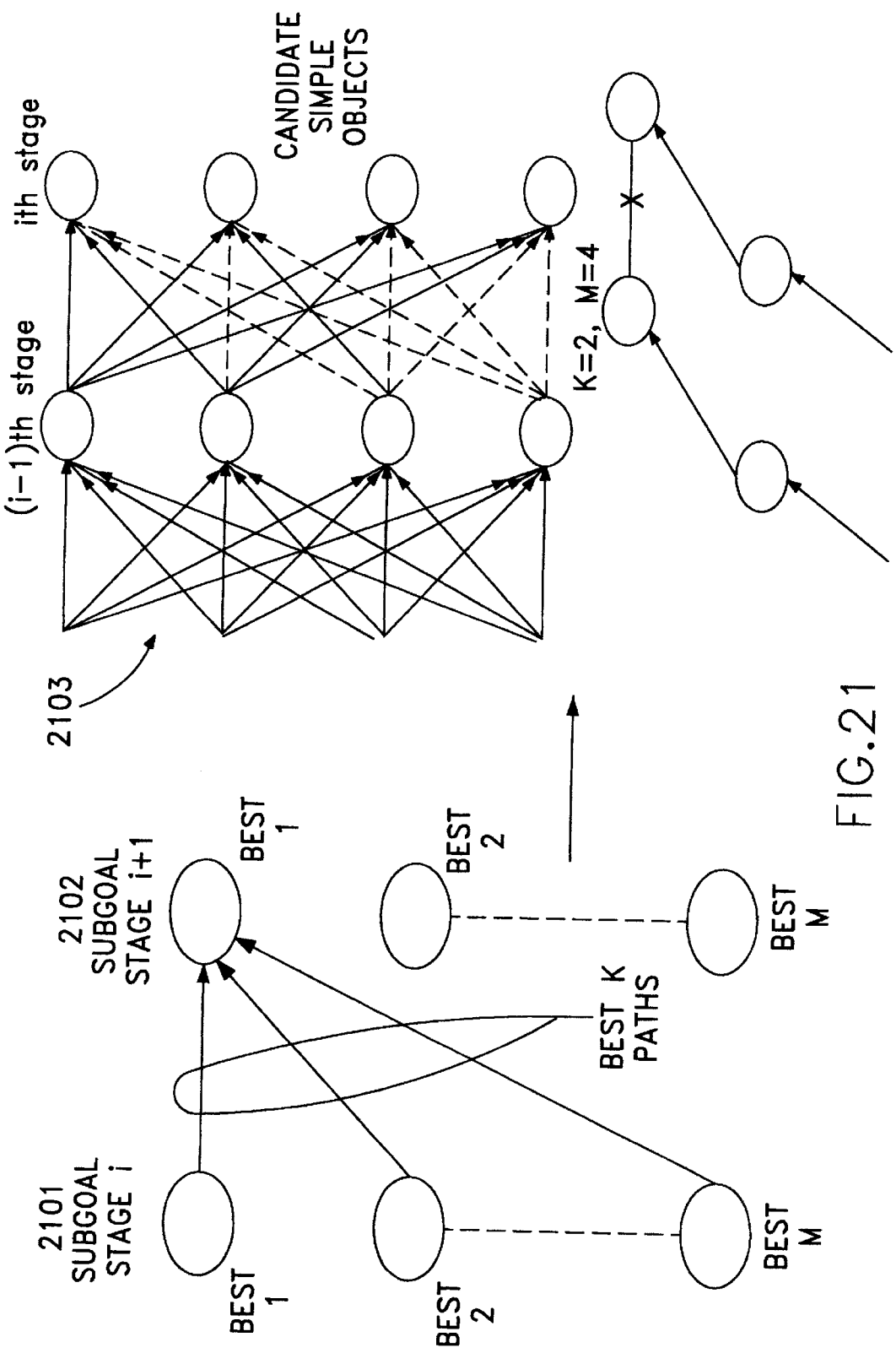
FIG. 21 graphs the manner for eliminating possible paths when traversing the trellis.

Sketch of Proof: the theorem is proved by contradiction (see FIG. 21). Assume that one of the K paths with the highest similarity scores is eliminated by the algorithm at stage j, as illustrated in 2103 of FIG. 21. This implies that the partial path metric of the survivor exceeds the one which should have been chosen.

If the remaining portion of the path is appended to the survivor at stage j, the total metric in the end will exceed the total metric of the one that should have been chosen (assuming that the weighted sum is used to implement the fuzzyAND). But this contradicts the definition of the maximum similarity score paths. Hence the maximum similarity paths cannot be eliminated by the algorithm.

Figure 22:
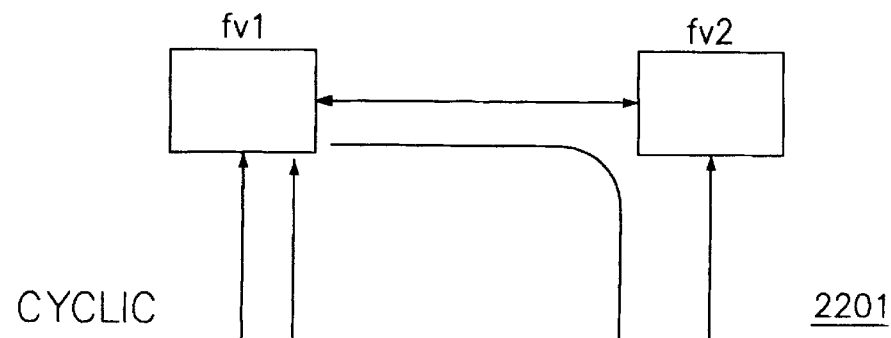
FIG. 22 shows examples of composite objects with loops or branches.
Figure 22:
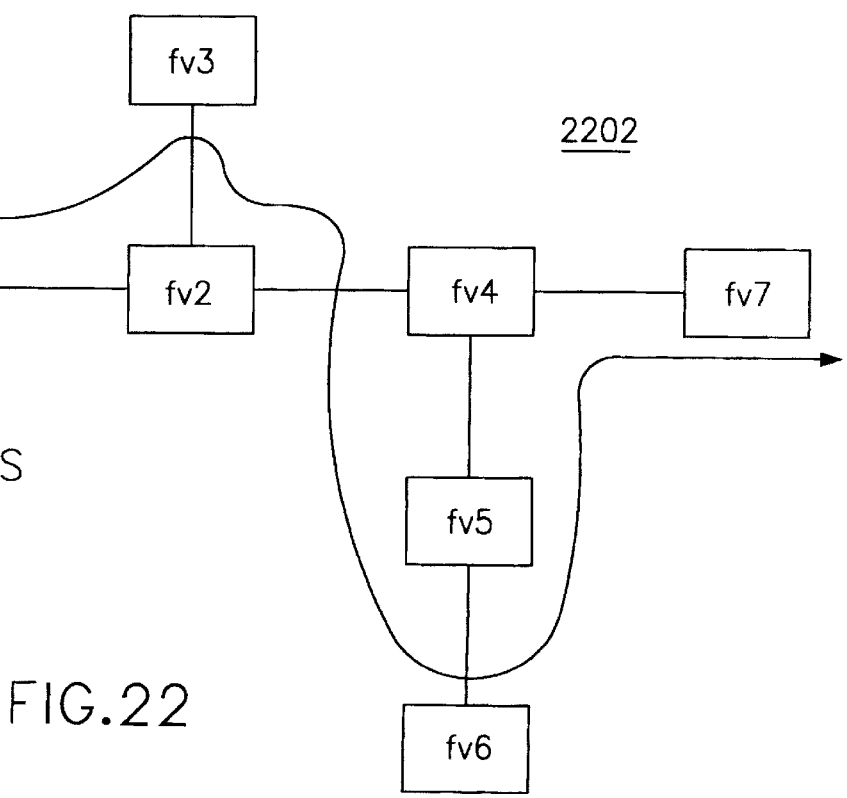

When a composite object is represented as a graph with either loops (2201 in FIG. 22) or branches (2202 in FIG. 22), the algorithm established in the previous subsection can still be utilized. After extracting a minimum spanning tree from the original graph, a depth-first or a breadth-first traversal of the spanning tree can be used to translate the original graph into a linear representation (indicated in FIG. 22 as the traversed line within both 2201 and 2202).

The linear representation and the trellis of 2201 are shown in 2301 and 2302, respectively, of FIG. 23. The linear representation consists of five object stages with one of the object stages (fv1) being visited twice. The translation result and the trellis traversal of 2202 are shown in FIGS. 2303 and 2304, respectively, of FIG. 23, in which two of the objects are visited twice. Duplication of the object stage is necessary in both cases in order to preserve the pairwise relationships needed in object retrieval, to be discussed later.

There is an additional complication for handling these situations, due to the fact that the best-K survivors are always searched following a single thread. Using 2301 in FIG. 23 as an example, the best K paths into the last stage, which is a replication of the first stage, might not be consistent with the original selection at the beginning stage for object component fv1 in 2301. An optimization of the algorithm comprises performing a self-consistency check in step 2. The self-consistency check comprises evaluating all the paths entering into a node, and eliminating those paths which are inconsistent with the paths chosen earlier.

An example of the execution of the inventive search method follows. In this case, the best-first path to the final sub-goal is initially explored with no candidates surviving. In this case, the content-based sub-goals are loosened, i.e., the next set of query blocks (next best L matches) are retrieved, in order to generate more candidate composites. In this case, the system back-tracks and starts the sequential program with the new candidates.

An example sequential program table, consisting of seven stages, is illustrated. Stages 1, 5, 6, 7 correspond to logical sub-goals, while stages 3, 4, 5 correspond to fuzzy or content-based sub-goals. The similarity scores $S_{i,m}$ that are computed for the i-th object in the m-th stage are given below, where x denotes truth value of 1.

| Composite | 1 | 2 | 3 | 4 | 5 | 6 | 7 |
|---|---|---|---|---|---|---|---|
| $a_0b_0c_0d_0$ | | | | | | | |
| $a_0b_0c_0d_1$ | x | 0.5 | 0.4 | 0.1 | x | x | 0 |
| ... | | | | | | | |
| $a_ib_jc_kd_1$ | x | 0.5 | 0.1 | | | | |
| $a_ib_jc_kd_{l+1}$ | x | 0.4 | 0.7 | 0.2 | x | x | x (answer) |
| $a_ib_jc_kd_{l+2}$ | x | 0.1 | | | | | |
| ... | | | | | | | |
| $a_{N-1}$ ... | x | 0.4 | 0.3 | 0.2 | 0 | | |

As the sub-goals are evaluated, candidate composites are eliminated by the logical rules and are scored by the fuzzy rules. The scores are used to prioritize evaluations of candidate composites in the sequential program. The candidate with the highest similarity score is examined first. This process is repeated until the last sub-goal is reached. The surviving candidate with the highest similarity score is the best match. This process guarantees that the global best match is found.

The invention has been described by way of a preferred embodiment. Thus, it should be understood that the detailed description should be construed as an example and not a limitation. The invention is properly defined by the appended claims.

What is claimed is:

1. A method for providing computer retrieval of images of composite objects in response to a query, each of said images having a plurality of features and wherein said images are stored in at least one storage medium and are indexed according to one or more of said plurality of features, comprising the steps of:

a. receiving an input query;

b. automatically identifying a plurality of sub-goals in said query;

c. automatically prioritizing said sub-goals by ordering said sub-goals according to the amount of information in said query; and d. processing said sub-goals in order of said prioritizing.

2. A method for providing computer retrieval of images of composite objects in response to a query, each of said images having a plurality of features and wherein said images are stored in at least one storage medium and are indexed according to one or more of said plurality of features, comprising the steps of:

a. automatically identifying a plurality of sub-goals in said query;

b. automatically prioritizing said sub-goals by ordering said sub-goals according to the amount of information in said query; and c. retrieving images having features similar to said sub-goals.

3. The method of claim 2 wherein said prioritizing comprises ordering said sub-goals to minimize the number of unconstrained lookups in said at least one storage medium.

4. The method of claim 2 wherein said prioritizing comprises ordering said sub-goals in order from the sub-goals having the most feature information to sub-goals having no feature information.

5. The method of claim 2 wherein said prioritizing comprises the steps of:
   organizing said sub-goals into a tree hierarchy of query blocks; and
   determining the retrieval process needed to satisfy each sub-goal.

6. The method of claim 5 wherein said prioritizing further comprises the step of selecting a plurality of combinations of sub-goal query blocks for retrieval processing.

7. The method of claim 5 further comprising caching said query blocks.

8. The method of claim 6 wherein said retrieving comprises evaluating a similarity measure for each query block in each of said combinations of sub-goal query blocks, said similarity measure representing the similarity of said sub-goal query to at least one feature of a candidate one of said plurality of stored images.

9. The method of claim 8 further comprising determining which of said at least one combination has the optimal similarity measure.

10. The method of claim 5 wherein said tree hierarchy comprises a plurality of stages for said query blocks and wherein said prioritizing further comprises selecting at least one path to one of said query blocks.

11. The method of claim 10 wherein said retrieving comprises the steps of, for a given stage:
   a. evaluating all paths to said one of said query blocks to arrive at a value for each path;
   b. ordering said paths according to said value;
   c. selecting a fixed number of ordered paths whose value is greatest;
   d. determining if paths in a different stage have a value greater than that for each of said selected paths;
   e. repeating steps a through d until no paths in any stage have a value greater than that for each of said selected paths.

12. Apparatus for computer retrieval of images of composite objects in response to a query, each of said images having a plurality of features, comprising:
   at least one storage medium for storing said images indexed according to one or more of said plurality of features;
   processing means for automatically identifying a plurality of sub-goals in said query and for automatically prioritizing said sub-goals by ordering said sub-goals according to the amount of information in said query; and
   a similarity retrieval engine for retrieving images having features similar to said sub-goals.

13. A program storage device readable by machine, tangibly embodying a program of instructions executable by the machine to perform method steps for providing computer retrieval of images of composite objects in response to a query, each of said images having a plurality of features and wherein said images are stored in at least one storage medium and are indexed according to one or more of said plurality of features, said method steps comprising:
   a. automatically identifying a plurality of sub-goals in said query;
   b. automatically prioritizing said sub-goals by ordering said sub-goals according to the amount of information in said query; and
   c. retrieving images having features similar to said sub-goals.

14. The device of claim 13 wherein said prioritizing comprises ordering said sub-goals to minimize the number of unconstrained lookups in said at least one storage medium.

15. The device of claim 13 wherein said prioritizing comprises ordering said sub-goals in order from the sub-goals having the most feature information to sub-goals having no feature information.

16. The device of claim 13 wherein said prioritizing comprises the steps of:
   organizing said sub-goals into a tree hierarchy of query blocks; and
   determining the retrieval process needed to satisfy each sub-goal.

17. The device of claim 16 wherein said prioritizing further comprises the step of selecting a plurality of combinations of sub-goal query blocks for retrieval processing.

18. The device of claim 16 wherein said method further comprising caching said query blocks.

19. The device of claim 17 wherein said retrieving comprises evaluating a similarity measure for each query block in each of said combinations of sub-goal query blocks, said similarity measure representing the similarity of said sub-goal query to at least one feature of a candidate one of said plurality of stored images.

20. The device of claim 19 wherein said method further comprising determining which of said at least one combination has the optimal similarity measure.

21. A program storage device readable by machine, tangibly embodying a program of instructions executable by the machine to perform method steps for computing a query, said method steps comprising the steps of:
   a. automatically identifying a plurality of sub-goals in said query;
   b. automatically prioritizing said sub-goals by ordering said sub-goals according to the amount of information in said query; and
   c. processing said sub-goals in order of said prioritizing.

* * * * *